US010864946B2

(12) United States Patent
Yoshida et al.

(10) Patent No.: US 10,864,946 B2
(45) Date of Patent: Dec. 15, 2020

(54) AUTOMOTIVE PANEL STRUCTURE

(71) Applicant: MAZDA MOTOR CORPORATION, Hiroshima (JP)

(72) Inventors: Tomoya Yoshida, Hiroshima (JP); Shuhei Narita, Hiroshima (JP); Keisuke Yamakawa, Hiroshima (JP); Takashi Sasaki, Hiroshima (JP); Ryuji Nonaka, Hiroshima (JP); Masanori Ishikawa, Hiroshima (JP); Katsumi Shiraishi, Hiroshima (JP); Seiji Nakano, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 113 days.

(21) Appl. No.: 16/170,837

(22) Filed: Oct. 25, 2018

(65) Prior Publication Data
US 2019/0126984 A1 May 2, 2019

(30) Foreign Application Priority Data

Nov. 1, 2017 (JP) .................................. 2017-211579
Jan. 31, 2018 (JP) .................................. 2018-014827
Jan. 31, 2018 (JP) .................................. 2018-014829

(51) Int. Cl.
*B62D 25/02* (2006.01)
*B62D 25/20* (2006.01)
(Continued)

(52) U.S. Cl.
CPC ................ *B62D 25/02* (2013.01); *B32B 3/04* (2013.01); *B32B 5/12* (2013.01); *B32B 5/18* (2013.01);
(Continued)

(58) Field of Classification Search
CPC .... B62D 25/02; B62D 25/20; B62D 25/2009; B62D 25/2018; B62D 25/2027; B62D 25/2045; B62D 25/2036; B62D 24/00; B62D 27/06; B62D 29/041; B62D 29/043; B62D 29/048; B60R 13/0815; B32B 3/04; B32B 5/12; B32B 5/18; B32B 27/065; B32B 27/12; B32B 27/32; B32B 2250/40;
(Continued)

(56) References Cited

U.S. PATENT DOCUMENTS 4,363,420 A 12/1982 Andrews
4,917,435 A 4/1990 Bonnett et al.
(Continued)

FOREIGN PATENT DOCUMENTS

JP H03-050081 A 3/1991
JP H08-026148 A 1/1996
(Continued)

*Primary Examiner* — Gregory A Blankenship
(74) *Attorney, Agent, or Firm* — Studebaker & Brackett PC

(57) ABSTRACT

In order to increase road noise transmission loss, a double-wall panel includes a core material. The core material is enclosed between an outer wall and an inner wall facing each other, and has at least a predetermined thickness across the panel in all in-plane directions of the walls. The core material has a specific surface area of 20,000 ($mm^2/cm^3$) or more, where the specific surface area is defined as a surface area per unit volume.

20 Claims, 23 Drawing Sheets

(51) Int. Cl.

| | |
|---|---|
| *B62D 29/04* | (2006.01) |
| *B32B 3/04* | (2006.01) |
| *B32B 5/12* | (2006.01) |
| *B32B 5/18* | (2006.01) |
| *B32B 27/06* | (2006.01) |
| *B32B 27/12* | (2006.01) |
| *B32B 27/32* | (2006.01) |
| *B62D 24/00* | (2006.01) |
| *B62D 27/06* | (2006.01) |
| *B60R 13/08* | (2006.01) |

(52) U.S. Cl.
CPC ............ *B32B 27/065* (2013.01); *B32B 27/12* (2013.01); *B32B 27/32* (2013.01); *B62D 24/00* (2013.01); *B62D 25/20* (2013.01); *B62D 27/06* (2013.01); *B62D 29/043* (2013.01); *B62D 29/048* (2013.01); *B32B 2250/40* (2013.01); *B32B 2262/0276* (2013.01); *B32B 2262/101* (2013.01); *B32B 2266/0207* (2013.01); *B32B 2266/0278* (2013.01); *B32B 2307/10* (2013.01); *B32B 2605/08* (2013.01); *B60R 13/0815* (2013.01)

(58) Field of Classification Search
CPC ...... B32B 2262/0276; B32B 2262/101; B32B 2266/0207; B32B 2266/0278; B32B 2307/10; B32B 2605/08
USPC .......... 296/191, 187.02, 187.08, 193.07, 204
See application file for complete search history.

(56) References Cited

U.S. PATENT DOCUMENTS

| | | | |
|---|---|---|---|
| 5,041,318 A | 8/1991 | Hulls | |
| 6,102,465 A * | 8/2000 | Nemoto | B60R 13/02 |
| | | | 181/286 |
| 6,618,944 B1 | 9/2003 | Persson et al. | |
| 6,685,250 B2 * | 2/2004 | Misaji | B32B 15/08 |
| | | | 181/290 |
| 7,025,408 B2 * | 4/2006 | Jones | B32B 27/06 |
| | | | 296/186.1 |
| 7,918,313 B2 * | 4/2011 | Gross | D04H 1/541 |
| | | | 181/294 |
| 10,160,407 B2 * | 12/2018 | Murasawa | B60R 13/083 |
| 2004/0057812 A1 | 3/2004 | Schaty | |
| 2004/0100125 A1 * | 5/2004 | Ogawa | B32B 27/04 |
| | | | 296/193.07 |
| 2009/0230729 A1 * | 9/2009 | Lusk | B62D 25/2054 |
| | | | 296/193.07 |
| 2012/0103714 A1 * | 5/2012 | Choi | B60L 58/26 |
| | | | 180/68.5 |
| 2013/0153331 A1 * | 6/2013 | Schneider | E04B 1/8409 |
| | | | 181/292 |
| 2013/0313862 A1 * | 11/2013 | Yamaji | B62D 25/2036 |
| | | | 296/203.01 |
| 2014/0205809 A1 * | 7/2014 | Ishii | B32B 3/30 |
| | | | 428/161 |
| 2014/0367998 A1 * | 12/2014 | Lavastida | B32B 27/065 |
| | | | 296/193.07 |
| 2015/0137560 A1 * | 5/2015 | Preisler | F16B 5/01 |
| | | | 296/193.07 |
| 2015/0260331 A1 * | 9/2015 | Shinohara | B32B 9/046 |
| | | | 428/35.4 |
| 2016/0052467 A1 * | 2/2016 | Dubois | B60K 13/04 |
| | | | 296/193.07 |
| 2016/0332675 A1 * | 11/2016 | Yang | B62D 29/04 |
| 2018/0050735 A1 * | 2/2018 | Jaunasse | B60R 13/083 |
| 2018/0156296 A1 * | 6/2018 | Alexander | B32B 7/12 |
| 2019/0126984 A1 * | 5/2019 | Yoshida | B32B 3/04 |

FOREIGN PATENT DOCUMENTS

| | | |
|---|---|---|
| JP | 2001-242873 A | 9/2001 |
| JP | 2001-518427 A | 10/2001 |
| JP | 2007017759 A | 1/2007 |
| JP | 2014-046846 A | 3/2014 |

\* cited by examiner

| | DENIER OF FIBER FOR OBTAINING INTENDED DENSITY [d] | PACKING DENSITY OF CORE MATERIAL [g/cm³] | MASS PER UNIT AREA OF DOUBLE-WALL PANEL | | | |
|---|---|---|---|---|---|---|
| | | | INNER WALL (UPPER PANEL) (t = 1.9 cm) [g/m²] | CORE MATERIAL (t = 30 cm) [g/m²] | OUTER WALL (LOWER PANEL) (t = 1.9 cm) [g/m²] | TOTAL [g/m²] |
| COMPARATIVE EXAMPLE | | 0.3 | 3420 | 9000 | 3420 | 15840 |
| EXAMPLE 1 | 3d | 0.11 | 3420 | 3300 | 3420 | 10140 |
| EXAMPLE 2 | 0.6d | 0.06 | 3420 | 1800 | 3420 | 8740 |
| EXAMPLE 3 | 0.1d | 0.024 | 3420 | 720 | 3420 | 7560 |

CASE 1

CASE 2

| SPECIFICATIONS OF NONWOVEN FABRIC ||||
| --- | --- | --- | --- |
| FIBER ORIENTATION | WEIGHT PER UNIT | PACKING DENSITY | THICKNESS |
| | [g/m$^2$] | [g/cm$^3$] | [mm] |
| TRANSVERSE | 600 | (0.060) | 10 |

| SPECIFICATIONS OF FIBER |||||||
| --- | --- | --- | --- | --- | --- | --- |
| MATERIAL | FIBER DENSITY | DENIER | DEGREE OF HOLLOWNESS | FIBER DIAMETER | FIBER CROSS-SECTIONAL SHAPE | SPECIFIC SURFACE AREA S/V |
| | [g/cm$^3$] | | [%] | [μm] | | [mm$^2$/cm$^3$] |
| PET | 1.38 | 0.6 | 0 | 7.84 | CIRCLE | 22175 |

AUTOMOTIVE PANEL STRUCTURE

CROSS-REFERENCE TO RELATED APPLICATIONS

This application claims priority to Japanese Patent Application No. 2018-014827, filed on Jan. 31, 2018, Japanese Patent Application No. 2017-211579, filed on Nov. 1, 2017, and Japanese Patent Application No. 2018-014829, filed on Jan. 31, 2018, the disclosure of which including the specification, the drawings, and the claims is hereby incorporated by reference in its entirety.

BACKGROUND

The present disclosure relates to automotive panel structures.

An automotive panel structure that includes a double-wall panel including an inner wall, an outer wall, and a sound damping material (core material) enclosed therebetween, is known, such as a sound insulating member described in Japanese Patent Publication No. 2001-242873. Such a double-wall panel has great transmission loss (sound insulating properties) and thereby reduces sound occurring when a car runs (road noise). The damping material needs to be adapted or modified in order to efficiently increase the transmission loss.

For example, in the double-wall panel of Japanese Patent Publication No. 2001-242873, the damping material as the core material is formed of a material in the shape of spherical grains or fibers, which are in contact with each other but are not fixed to each other, and therefore, can easily convert the energy of sound into kinetic energy, resulting in an increase in the road noise transmission loss.

In Japanese Patent Publication No. 2001-242873, attention is paid almost only to the damping material itself in the attempt to increase the road noise transmission loss. Japanese Patent Publication No. 2001-242873 does not have a perspective on how the damping material as the core material should be adapted or modified in the whole system of the double-wall panel including not only the damping material, but also the inner wall, the outer wall, and a gas enclosed together with the damping material between the walls. Therefore, there is room for improvement.

Note that Japanese Patent Publication No. 2001-242873 describes the thickness, length, etc., of the damping material as the core material in the case where the damping material is formed of fibers, and the density of the damping material in the case where the damping material is formed of spherical grains. However, Japanese Patent Publication No. 2001-242873 does not explicitly describe any specific basis for these numerical limitations.

SUMMARY

The present disclosure describes implementations of an automotive panel structure including a double-wall panel that has greater road noise transmission loss.

The present disclosure is directed to an automotive panel structure. The panel structure includes a double-wall panel. The double-wall panel includes an inner wall, an outer wall facing the inner wall, and a core material enclosed between the inner wall and the outer wall, and having at least a predetermined thickness across the panel in all in-plane directions of the walls. The core material has a specific surface area of 20,000 $mm^2/cm^3$ or more, where the specific surface area is defined as a surface area per unit volume.

With the above configuration, the heat absorption effect of the core material can reduce the spring elastic modulus k of the core layer and thereby reduce the resonant frequency of the double-wall panel, resulting in a significant increase in road noise transmission loss.

Here, the in-plane directions refer to directions perpendicular to a thickness direction between the inner wall and the outer wall.

The core material may have a packing density of 0.11 $g/cm^3$ or less.

With the above configuration, the specific surface area of the core material can be set to 20,000 ($mm^2/cm^3$) or more without an increase in the weight of the core material.

The core material may be a fibrous substance and have a fiber thickness of 0.1-3 denier.

With the above configuration, the specific surface area of the core material can be set to 20,000 ($mm^2/cm^3$) or more without an increase in the weight of the core material.

The fibrous substance may contain at least one of polyester, acrylic resin, nylon, polypropylene, cotton, and rayon.

With the above configuration, the core material having a specific surface area of 20,000 ($mm^2/cm^3$) or more is more easily configured.

The core material may be a gas-permeable foam substance and have a framework thickness of 3-7 μm.

With the above configuration, the specific surface area of the core material can be set to 20,000 ($mm^2/cm^3$) or more without an increase in the weight of the core material.

The foam substance may contain at least one of polyurethane and rubber.

With the above configuration, the core material having a specific surface area of 20,000 ($mm^2/cm^3$) or more is more easily configured.

The foam substance may have an open-cell structure in which bubbles connect to each other.

The predetermined thickness may be in the range of 15-50 mm.

With the above configuration, the road noise transmission loss can be efficiently increased while the thickness of the double-wall panel is limited in the practical thickness range.

Incidentally, concerning double-wall panels, which have great transmission loss (sound insulating properties) with respect to sound occurring when a car runs (road noise), it is considered that if the panel through which noise enters and the panel through which noise exits have the same mass, the transmission loss is effectively increased.

Therefore, in general, it is considered that as in the sound insulating member of the double-wall structure disclosed in Japanese Patent Publication No. 2001-242873, panels having substantially the same shape and material, and therefore, having substantially the same mass, are used as the inner wall (2) and the outer wall (3). However, there is room for improvement in the sound damping function of the core material.

With the above in mind, the double-wall panel may further include a core layer including a gas and the core material. The core material may be formed of a fibrous substance or a gas-permeable foam substance. A stiffness of the outer wall may be lower than a stiffness of the inner wall.

With the above configuration, the gas can be significantly moved in the core layer, whereby the energy of sound can be damped.

The stiffness of the outer wall may be lower than or equal to the stiffness of PP or PE. The stiffness of the inner wall may be higher than or equal to the stiffness of glass fiber-reinforced resin.

With the above configuration, the stiffness of the outer wall is lower than or equal to the stiffness of PP or PE, and therefore, the gas in the core layer can be significantly moved due to significant vibrations of the outer wall caused or induced by incident sound, whereby the sound damping effect can be enhanced.

Meanwhile, the stiffness of the inner wall is higher than or equal to the stiffness of glass fiber-reinforced resin, and therefore, the inner wall can maintain a sufficient stiffness to serve as a panel included in the interior (a space where a driver and passengers are seated) of a car, or a fuel tank, etc.

Here, the stiffness of the outer wall that is lower than or equal to that of PP refers to a stiffness of 5000 MPa or less, preferably 2500 MPa or less, and more preferably 1500 MPa or less. Meanwhile, the stiffness of the inner wall that is higher than or equal to that of glass fiber-reinforced resin refers to a stiffness of 3 GPa or more.

Note that the outer wall having a stiffness lower than or equal to that of PE (1000 MPa) is preferably applied to, for example, a panel included in a fuel tank.

The double-wall panel may further include a vertical wall configured to join the inner wall and the outer wall together, wherein the vertical wall is disposed at a peripheral portion of the inner and outer walls. The vertical wall may be mostly formed of the same material as that of the outer wall.

With the above configuration, the effect of damping sound transmitted through the vertical wall can be enhanced.

The double-wall panel may further include a vertical wall configured to join the inner wall and the outer wall together, wherein the vertical wall is disposed at a peripheral portion of the inner and outer walls. The vertical wall may be mostly formed of the same material as that of the inner wall.

With the above configuration, the support (linking) stiffness between the inner wall and the outer wall can be increased.

The core layer may be disposed closer to the outer wall between the inner wall and the outer wall. The double-wall panel may further include a stiff material having a stiffness higher than or equal to that of the inner wall, and disposed closer to the inner wall between the inner wall and the outer wall.

With the above configuration, the stiffness of the inner wall can be increased, and at the same time, the energy of sound entering through the outer wall can be efficiently converted into kinetic energy, and heat generated due to compression can be efficiently absorbed by the core layer.

Note that the stiff material is preferably a honeycomb material.

The core layer may contain the core material formed of a fibrous substance. The core material may be disposed with a fiber direction thereof pointing along a wall surface (panel surface) of the outer wall.

With the above configuration, the damping of vibrations of the outer wall by the core material formed of a fibrous substance that occurs when noise enters can be reduced, and therefore, the characteristics that the outer wall easily vibrates due to its low stiffness can be exploited.

Note that the core material is disposed with the fiber direction (the longitudinal direction of fibers) thereof pointing along the wall surface (panel surface) of the outer wall. More preferably, the fiber direction is parallel to the wall surface.

The inner wall and the outer wall may have the same mass.

With the above configuration, the stiffness of the outer wall is lower than the stiffness of the inner wall, and the inner wall and the outer wall have the same mass. As a result, the energy of sound in a gas contained in the core layer can be converted into kinetic energy, and the resonant frequency of the double-wall panel can be reduced, resulting in a significant increase in road noise transmission loss.

Incidentally, in conventional car body structures, a peripheral edge of a hollow double-wall panel is formed by flanges joined to each other, and therefore, the inside of the peripheral edge of the hollow double-wall panel is not filled with a core material. Therefore, sound insulating properties and heat insulating properties are disadvantageously reduced at a joint portion between the hollow double-wall panel and a joint mating member.

Such a drawback can be overcome by filling the inside of the joint mating member with a core material. However, in this case, the step of filling the inside of the joint mating member with a core material disadvantageously needs to be added.

With the above in mind, the double-wall panel may be a hollow double-wall panel, and an edge of the hollow double-wall panel may be joined to a joint surface of a joint mating member. In the hollow double-wall panel, peripheral edges of the two walls may be joined together, and a closed space between the two walls may be filled with the core material to such an extent that an inside of the edge of the hollow double-wall panel is filled with the core material. When the edge of the hollow double-wall panel is joined to the joint surface of the joint mating member, the core material contained in the edge of the hollow double-wall panel may cover the joint surface of the joint mating member.

With the above configuration, the inside of the edge of the hollow double-wall panel is also filled with the core material. When the edge of the hollow double-wall panel is joined to the joint surface of a joint mating member, the core material contained in the edge of the hollow double-wall panel covers the joint surface of the joint mating member. Therefore, even when the inside of the joint mating member is not filled with a core material, sound insulating properties and heat insulating properties can be ensured by the joint portion between the edge of the hollow double-wall panel and the joint surface of the joint mating member.

The joint mating member may be a framework member of a car body, or a panel having the same structure as that of the hollow double-wall panel. The edge of the hollow double-wall panel may be joined to the joint surface of the joint mating member by a fastening part. A through-hole through which the fastening part is inserted may be provided in the edge of the hollow double-wall panel, penetrating through the edge in a thickness direction of the edge. The hollow double-wall panel may have an aperture ratio of less than 1%, where the aperture ratio is defined as the proportion of the opening area of one of openings of the through-hole to the area of one of main surfaces of the hollow double-wall panel. A gap between the edge of the hollow double-wall panel and the fastening part may be sealed by a sealing material.

With the above configuration, the hollow double-wall panel is joined to the framework member of a car body or another hollow double-wall panel having the same structure (i.e., various joint mating members). Therefore, the hollow double-wall panel can preferably be used as a panel member for various parts in the interior of a car.

Furthermore, with the above configuration, the hollow double-wall panel and a joint mating member can be joined together mechanically (i.e., with a sufficient joint strength).

Furthermore, with the above configuration, the aperture ratio of the through-hole provided in the hollow double-wall panel is less than 1%. Therefore, the through-hole can be provided in the hollow double-wall panel with about 70% or more (i.e., sufficient sound insulating properties in practical use) of the sound insulating properties that are achieved when the hollow double-wall panel is perfectly hermetically sealed (i.e., the through-hole is absent).

Furthermore, with the above configuration, the gap between the edge of the hollow double-wall panel and the fastening part is sealed using a sealing material. Therefore, even in the case where a through-hole through which the fastening part is inserted is provided in the edge of the hollow double-wall panel, sufficient hermeticity of the closed space in the hollow double-wall panel can be ensured.

A core layer formed of the core material contained in the closed space of the hollow double-wall panel may have a thickness in the range of 7-50 mm.

With the above configuration, both sound insulating properties and thin thickness of the hollow double-wall panel can be simultaneously achieved. In particular, in the case where the thickness of the core layer of the hollow double-wall panel is 7 mm, at least the minimum sound insulating properties of the hollow double-wall panel required in practical use can be ensured, while the thickness of the hollow double-wall panel is substantially minimized. Meanwhile, in the case where the thickness of the core layer of the hollow double-wall panel is 50 mm, the sound insulating properties of the hollow double-wall panel can be substantially maximized, while the thickness of the hollow double-wall panel is set to a maximum of the practical thickness range.

The two walls are formed of materials may have different masses, and may have a mass difference percentage $\Delta M$ in the range of ±10%.

With the above configuration, the hollow double-wall panel can have better sound insulating properties than those of conventional panels.

The hollow double-wall panel may have the edge, and a panel body excluding the edge. The edge may have a vertical portion protruding perpendicularly to the panel body. A surface in a thickness direction of the vertical portion may be joined to the joint surface of the joint mating member.

With the above configuration, even if a load is applied to the joint surface in the vertical direction (i.e., the thickness direction of the horizontal portion) with respect to the hollow double-wall panel, the horizontal portion is hooked by the joint surface of the joint mating member, and therefore, the hollow double-wall panel can be substantially prevented from being disjoined from the joint mating member.

The hollow double-wall panel may have the edge, and a panel body excluding the edge. The edge may have a sloping portion sloping in one direction in a thickness direction of the panel body. A surface facing in a thickness direction of the sloping portion may be joined to the joint surface of the joint mating member.

With the above configuration, a load can be applied uniformly to the entire surface (i.e., a joint surface to a joint mating member) facing in the thickness direction of the sloping portion. As a result, the concentration of a load to a portion of a joint surface (e.g., a base end of the edge of the hollow double-wall panel) to a joint mating member of the sloping portion can be reduced.

According to the present disclosure, the road noise transmission loss can be increased.

DETAILED DESCRIPTION

Embodiments of the present disclosure will now be described with reference to the accompanying drawings. The following description is merely illustrative.

First Embodiment

Firstly, a first embodiment will be described. The first embodiment is related to claims 1-15, and is shown in FIGS. 1-14.

A panel structure 1 according to the first embodiment is applicable to the body of a car. The panel structure 1 includes a double-wall panel 5. The panel structure 1 is particularly applicable to panel members (e.g., a roof panel, door panel, dashboard panel, floor panel, etc.) that form the interior of a car. In the description that follows, an example case will be described where the panel structure 1 is applied to a floor panel that forms a floor FL of the interior of a car.

[(1) Basic Structure of Double-Wall Panel of First Embodiment]

The panel structure 1 has the same basic configuration as that of a car body structure according to a second embodiment described below. The basic configuration is more highly related to the second embodiment, and therefore, will be described in greater detail in the description of the second embodiment.

Figure 1:
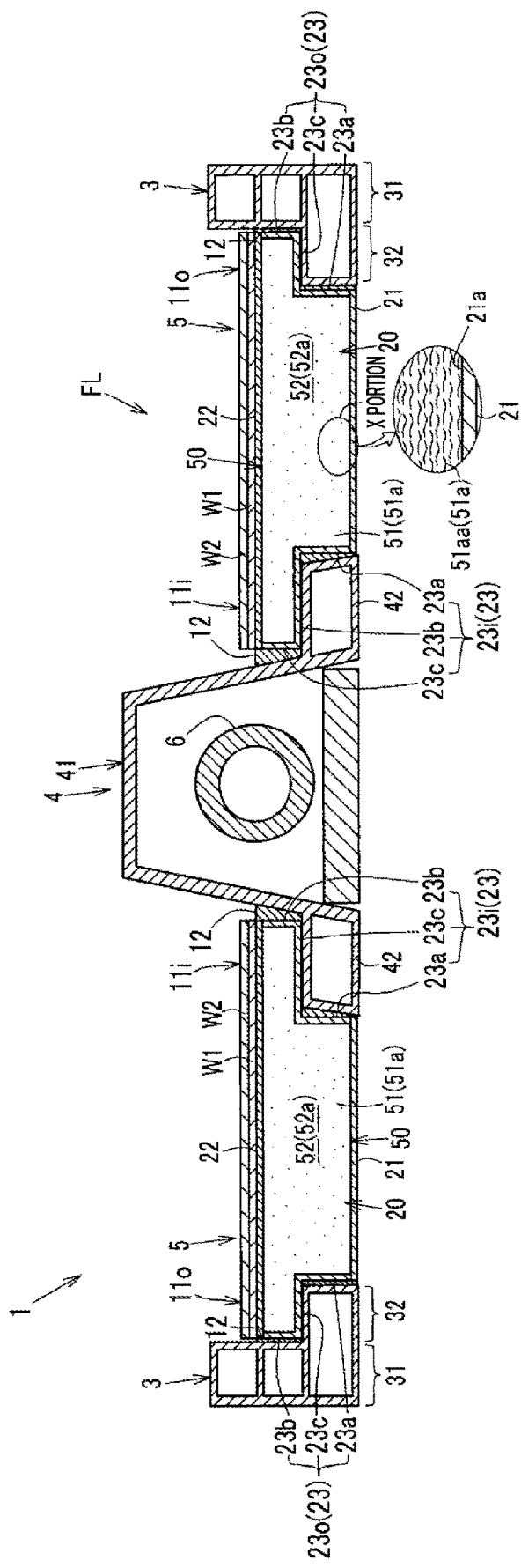
FIG. 1 is a cross-sectional view of a panel structure according to a first embodiment.

FIG. 1 is a cross-sectional view of the panel structure 1 of the first embodiment included in a car, taken along a plane perpendicular to the longitudinal direction of the car. The panel structure 1 is laterally symmetrical, and therefore, configurations of a center portion and one of left and right portions of the panel structure 1 in the transverse direction of a car will be described.

As shown in FIG. 1, the panel structure 1 includes a left and a right side sill 3, a center tunnel 4, and a left and a right double-wall panel 5. As described in detail below, the double-wall panels 5 each include an inner wall 22, an outer wall 21 facing the inner wall 22, and a core material 51a enclosed between the inner wall 22 and the outer wall 21.

The side sills 3 are framework members of steel that form a left and a right end of a floor FL in the interior of a car. The side sills 3 are hollow inside and extend in the car longitudinal direction. The side sills 3 each have a body 31 and an inward protrusion 32 that protrudes from a lower portion of the body 31 inward in the car transverse direction. The inward protrusion 32 supports an outer end in the car transverse direction of the double-wall panel 5.

The center tunnel 4 is disposed at a center of the floor FL in the interior of a car, extending in the car longitudinal direction. In a cross-section thereof perpendicular to the car longitudinal direction, the center tunnel 4 is hollow and has substantially a trapezoidal shape protruding upward from the floor FL in the interior of a car. An exhaust pipe 6 extending in the car longitudinal direction, etc., are disposed in the center tunnel 4.

The center tunnel 4 has a body 41 and outward protrusions 42 that protrude from a lower portion of the body 41 outward in the car transverse direction. The outward protrusions 42 each support an inner end in the car transverse direction of the corresponding double-wall panel 5.

The inward protrusions 32 and the outward protrusions 42 have upper surfaces that are flat and have the same height for supporting the double-wall panels 5 horizontally.

The double-wall panels 5 each include an outer wall 21 (lower wall) that is disposed in the exterior of a car, an inner wall 22 (upper wall) that is disposed in the interior of a car, vertical walls 23 (a transverse outer wall 23$o$, a transverse inner wall 23$i$, and if necessary, a front wall and a rear wall (not shown)) that vertically link peripheral edges of the outer wall 21 and the inner wall 22. These parts of the double-wall panel 5 are substantially integrally formed in one piece by blow molding, etc., so that the double-wall panel 5 has a closed cross-sectional portion (hollow portion) 20 inside.

The transverse outer wall 23$o$ and the transverse inner wall 23$i$ as the vertical walls 23 each include a lower vertical wall 23$a$, an upper vertical wall 23$b$, and a horizontal wall 23$c$ horizontally linking an upper end of the lower vertical wall 23 and a lower end of the upper vertical wall 23 together. These parts are integrally formed in one piece, which is in the shape of a step.

The outer wall 21 is a wall (lower panel) through which noise enters the double-wall panel 5, and the inner wall 22 is a wall (upper wall) through which noise leaves the double-wall panel 5, in a direction in which noise transmits from the outside of (below) the interior of a car into the interior of the car (above) (the thickness direction of the double-wall panel 5).

The outer wall 21, the inner wall 22, and the vertical walls 23 of the double-wall panel 5 are all formed of resins. In this example, the outer wall 21 is formed of PP, and the inner wall 22 is formed of glass fiber-reinforced resin, so that the bending stiffness of the outer wall 21 is lower than the bending stiffness of the inner wall 22. In this example, the vertical walls 23 are formed of the same PP as that of the outer wall 21.

Specifically, the bending stiffness of the inner wall 22 is set higher than or equal to that of glass fiber-reinforced resin (3 GPa or more), and the bending stiffness of the outer wall 21 is set lower than or equal to that of PP (5000 MPa or less, preferably 2500 MPa or less, and more preferably 1500 MPa or less).

Here, the stiffness (elastic modulus) of the inner wall 22 is preferably set in the range of, for example, 3-15 GPa, taking into account the relationship between the mass and required performance of the inner wall 22.

Specifically, in the case where the inner wall 22 is thin, e.g., has a thickness of about 1.5 mm, the inner wall 22 is required to have a stiffness of 15 GPa. Meanwhile, in the case where the inner wall 22 is thick, e.g., has a thickness of about 2.9 mm, the inner wall 22 is required to have a stiffness of as low as 3 GPa, which still satisfies the required performance. Therefore, if the inner wall 22 is configured to have a stiffness in the range of 3-15 GPa, it is preferable to set the thickness of the inner wall 22 to about 1.5-2.9 mm.

A closed cross-sectional portion 20 between the outer wall 21 and the inner wall 22 is substantially completely filled with a core material 51a and a gas 52a (e.g., air). In the closed cross-sectional portion 20, a solid layer 51 formed of the core material 51a and a gas layer 52 formed of the gas 52a constitute a core layer 50.

The core material 51a, which is formed of a fibrous substance, contains, for example, polyester, acrylic resin, nylon, polypropylene, cotton, or rayon. In this example, polyester is employed.

As shown in an enlarged view of an X portion in FIG. 1, the core material 51a, which is enclosed in the closed cross-sectional portion 20 and is formed of a fibrous substance, contains a large number of fibers 51aa, most of which are aligned along a wall surface 21a (panel surface) of the outer wall 21 (i.e., the fiber direction (longitudinal direction) of the fibers 51aa is along the wall surface 21a). In this example, most of the fibers 51aa of the fibrous core material 51a are disposed substantially parallel to the wall surface 21a of the outer wall 21.

As shown in FIG. 1, an outer portion in the car transverse direction of each double-wall panel 5 is formed as a joint portion 11o to the corresponding side sill 3, and an inner portion in the car transverse direction of each double-wall panel 5 is formed as a joint portion 11i to the center tunnel 4. The joint portions 11o and 11i are thinner than a center portion in the car transverse direction of the double-wall panel 5.

The outer joint portion 11o in the car transverse direction of the double-wall panel 5 is supported by the inward protrusion 32 of the side sill 3, while the inner joint portion 11i in the car transverse direction of the double-wall panel 5 are supported by the outward protrusion 42 of the center tunnel 4, so that the double-wall panel 5 spans between the side sill 3 and the center tunnel 4.

In addition, an adhesive material 12 is interposed between portions of the joint portion 11o of the double-wall panel 5 and the side sill 3 that face each other, and between portions of the joint portion 11i of the double-wall panel 5 and the center tunnel 4 that face each other. Thus, the double-wall panel 5 is joined to the side sills 3 and the center tunnel 4 by the adhesive material 12.

Note that a sound absorption layer W1 and a skin layer W2 are disposed in that order on an upper surface of the inner wall 22 of the double-wall panel 5.

The double-wall panel 5 of the first embodiment has a wall-to-wall distance (a gap between the outer wall 21 and the inner wall 22) in the range of 15-30 mm across the panel in all in-plane directions (the car transverse direction and the car longitudinal direction). Specifically, the double-wall panel 5 has a wall-to-wall distance of at least 15 mm at the joint portions 11i and 11o, which are thinner than the center portion in the car transverse direction.

[(2) Detailed Structure of Double-Wall Panel of First Embodiment]

The present inventors have mainly paid attention to a spring elastic modulus k (described below) of the core layer 50, and a stiffness ratio of the inner and outer walls 21 and 22, etc. The double-wall panel 5 of the first embodiment is adapted or modified in terms of these two points so that the road noise transmission loss of the double-wall panel 5 of the first embodiment is increased compared to that of conventional double-wall panels.

(2A) Spring Elastic Modulus of Core Layer

Concerning the spring elastic modulus k of the core layer 50, to which the present inventors have paid attention, a background art that led to the attention will firstly be described.

Figure 2A:
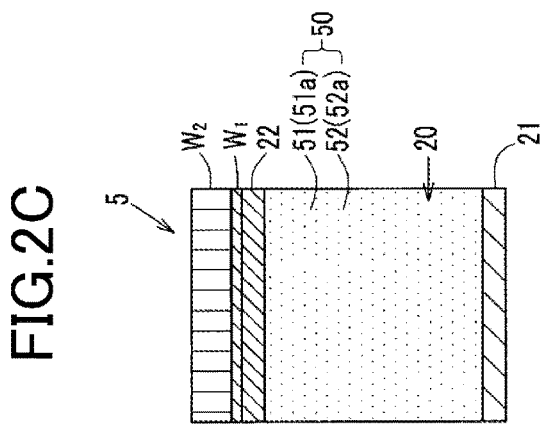
FIGS. 2A-2C are schematic diagrams showing a double-wall panel of FIG. 1.
Figure 2B:
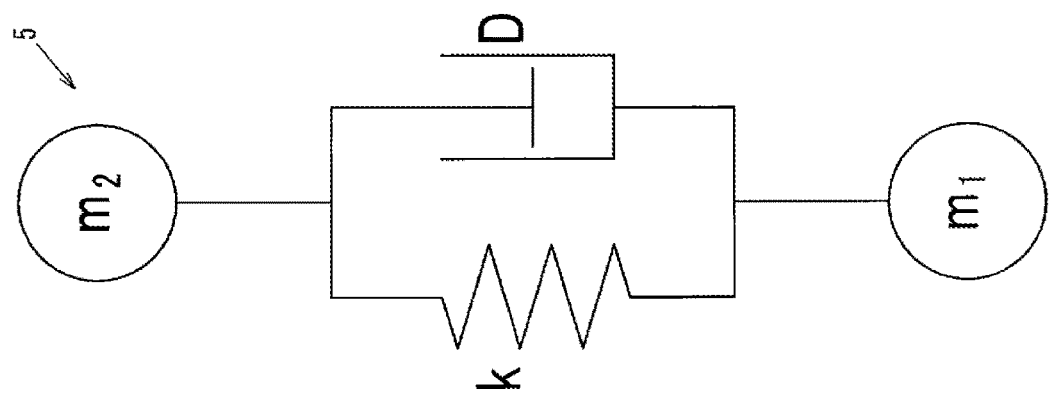

FIG. 2A is a schematic diagram showing the basis of a spring-mass-damper model representing the double-wall panel 5, indicating how noise N entering through the outer wall 21 is transmitted before exiting through the inner wall 22. FIG. 2B is a diagram showing a spring-mass-damper model representing the double-wall panel 5.

Note that the mass of the outer wall 21 as an incident panel of FIG. 2B is represented by $m_1$ (kg), the mass of the inner wall 22 as an exit panel of FIG. 2B is represented by $m_2$ (kg), the spring elastic modulus of the core layer 50 (i.e., how easily the gas 52a enclosed in the closed cross-sectional portion 20 is compressed) is represented by k (N/m), and the damping coefficient of the core layer 50 is represented by D (N·s/m).

In the case of the spring-mass-damper model of FIG. 2B representing the double-wall panel 5, which has a single-degree-of-freedom system, when the noise N enters through the outer wall 21 as shown in FIG. 2A, the resonant frequency $f_{rm}$ of the double-wall panel 5 can be represented on the basis of an equation of motion of the double-wall panel 5 by:

$$f_{rm} = \frac{1}{2\pi}\sqrt{\frac{k}{m_e}} \quad (1)$$

where $m_e$ represents the effective mass of each of the inner and outer walls 21 and 22, and $m_e$ and k can be expressed by:

$$m_e = \frac{m_1 m_2}{m_1 + m_2}, k = \frac{\rho c^2}{d} \quad (2)$$

where ρ represents the density of the gas 52a, c represents the speed of sound, d represents the wall-to-wall distance, and $\rho c^2$ represents the bulk modulus E (gas elastic modulus) of the core layer 50.

Figure 14A:
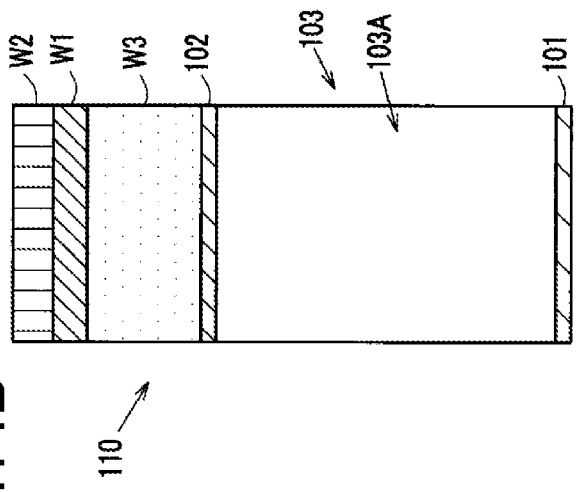
FIGS. 14A and 14B are diagrams schematically showing panel structures according to Conventional Examples 1 and 2, respectively, related to the first embodiment.
Figure 14B:
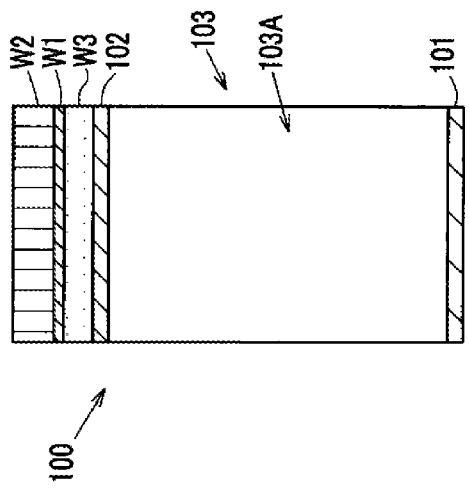
Figure 14C:
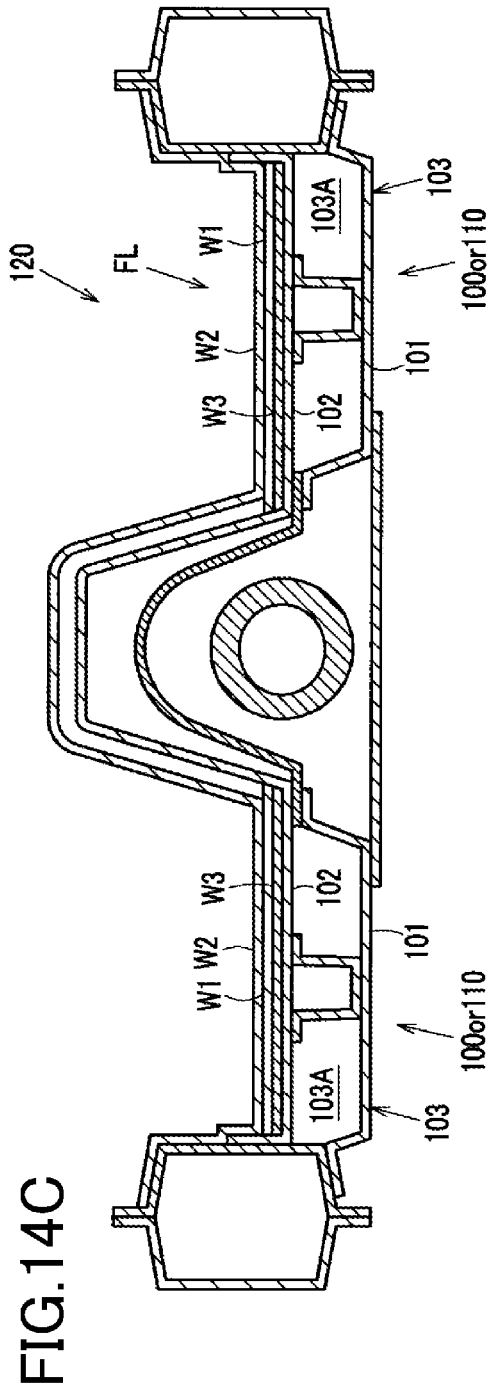
FIG. 14C is a cross-sectional view of a conventional panel structure including one of the panel structures of FIGS. 14A and 14B.

Incidentally, FIG. 14A is a schematic diagram of a panel structure 100 according to Conventional Example 1. FIG. 14B is a schematic diagram of a panel structure 110 according to Conventional Example 2. FIG. 14C is a cross-sectional view of a conventional body floor structure 120 to which the panel structure 100 of Conventional Example 1 or the panel structure 110 of Conventional Example 2 is applied.

As shown in FIG. 14A, the panel structure 100 of Conventional Example 1 is based on a pseudo-double-wall structure 103 that includes a lower cover 101, a steel material 102, and a closed cross-sectional portion 103A enclosed by the lower cover 101 and the steel material 102, and therefore, is hollow inside. The double-wall structure 103 has a bolt insertion hole (not shown), etc., which reduces the hermeticity thereof. The panel structure 100 further includes various panels W1-W3 that are stacked on the upper surface of the steel material 102.

Note that in FIGS. 14A, 14B, and 14C, the panel W1 is a sound absorption layer, the panel W2 is a skin layer, and the panel W3, which is formed of, for example, felt, is additionally provided to, together with the panels W1 and W2, enhance the function of the pseudo-double-wall structure 103.

The panel structure 110 of Conventional Example 2 is a variation of Conventional Example 1. As shown in FIG. 14B, in the panel structure 110, the felt W3 is about four times as thick as Conventional Example 1, and the sound absorption layer W1 is about seven times as thick as Conventional Example 1, so that the sound absorption effect is improved. Meanwhile, the entire panel structure 110 is about 1.15 times as thick as Conventional Example 1.

Figure 3:
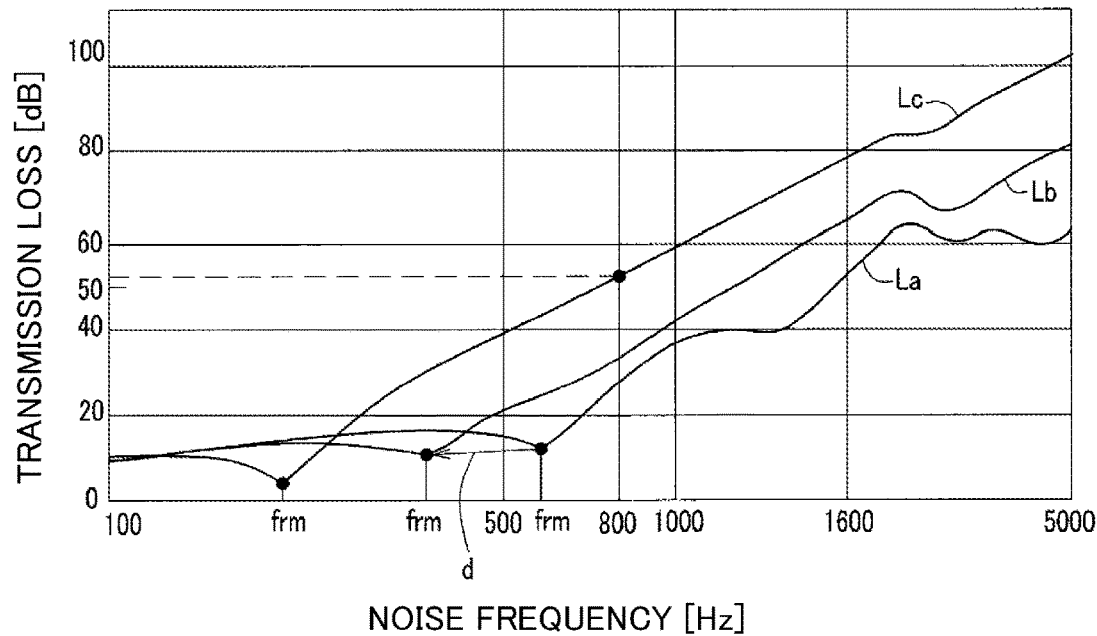
FIG. 3 is a diagram showing a relationship between the transmission loss of a double-wall panel and the frequency of noise.

FIG. 3 is a diagram showing a relationship between a noise frequency and a noise transmission loss (sound insulation level) caused by the panel structure of the floor FL in the interior of a car.

In FIG. 3, a waveform La is of the panel structure 100 of Conventional Example 1, and a waveform Lb is of the panel structure 110 of Conventional Example 2.

Here, the noise frequency of road noise is, for example, 500 Hz or more. In particular, noise unpleasant to a passenger is considered to be in the frequency region of about 800-1600 Hz.

As can be seen from FIG. 3, while the resonant frequency $f_{rm}$ is lower in Conventional Example 2 (see the waveform Lb) than in Conventional Example 1 (see the waveform La), the transmission loss (sound insulation performance) with respect to road noise (noise frequency: 500 Hz or more) is higher in Conventional Example 2 than in Conventional Example 1. This suggests that in the graph of FIG. 3, a shift of the resonant frequency $f_{rm}$ to a lower frequency (see an arrow d in FIG. 3), i.e., a decrease in the value of the resonant frequency $f_{rm}$, contributes to an increase in the road noise transmission loss.

As can be seen from Expression (1), to decrease the spring elastic modulus k of the core layer 50 is effective in decreasing the resonant frequency $f_{rm}$.

With the above in mind, the present inventors have paid attention to reduction of an apparent increase in the effective elastic modulus of the core layer 50 during compression (also hereinafter referred to as "spring elastic modulus decreasing means 1"), and decreasing of the bulk modulus E of the core layer 50 (also hereinafter referred to "spring elastic modulus decreasing means 2"), as specific means for decreasing the spring elastic modulus k of the core layer 50.

((2A-1) Spring Elastic Modulus Decreasing Means 1)

The above means for reducing an apparent increase in the effective elastic modulus of the core layer 50 during compression will be described.

When noise initially enters the outer wall 21 as the incident panel, the outer wall 21 vibrates. In this process, when the outer wall 21 is deformed and bent into the closed cross-sectional portion 20, the closed cross-sectional portion 20 (the core layer 50) is compressed due to the bending deformation, and its internal pressure increases because the closed cross-sectional portion 20 is a hermetic space.

As can be seen from Expression (1), as the spring elastic modulus k of the core layer 50 increases, the resonant frequency $f_{rm}$ increases, which is disadvantageous in the attempt to increase the road noise transmission loss as described above. Therefore, the increase of the internal pressure of the closed cross-sectional portion 20, which is equivalent to the spring elastic modulus k of the core layer 50, is not preferable.

Under these circumstances, the present inventors have paid attention to the fact that the compression of the closed cross-sectional portion 20 (the core layer 50) warms and expands the gas 52a in the core layer 50, which leads to an apparent increase in the effective elastic modulus of the core layer 50. Therefore, in the first embodiment, in order to reduce the apparent increase in the effective elastic modulus of the core layer 50, the core material 51a formed of a fibrous substance, with which the closed cross-sectional portion 20 is filled, is used to absorb heat generated in the gas 52a due to the compression.

Figure 4:
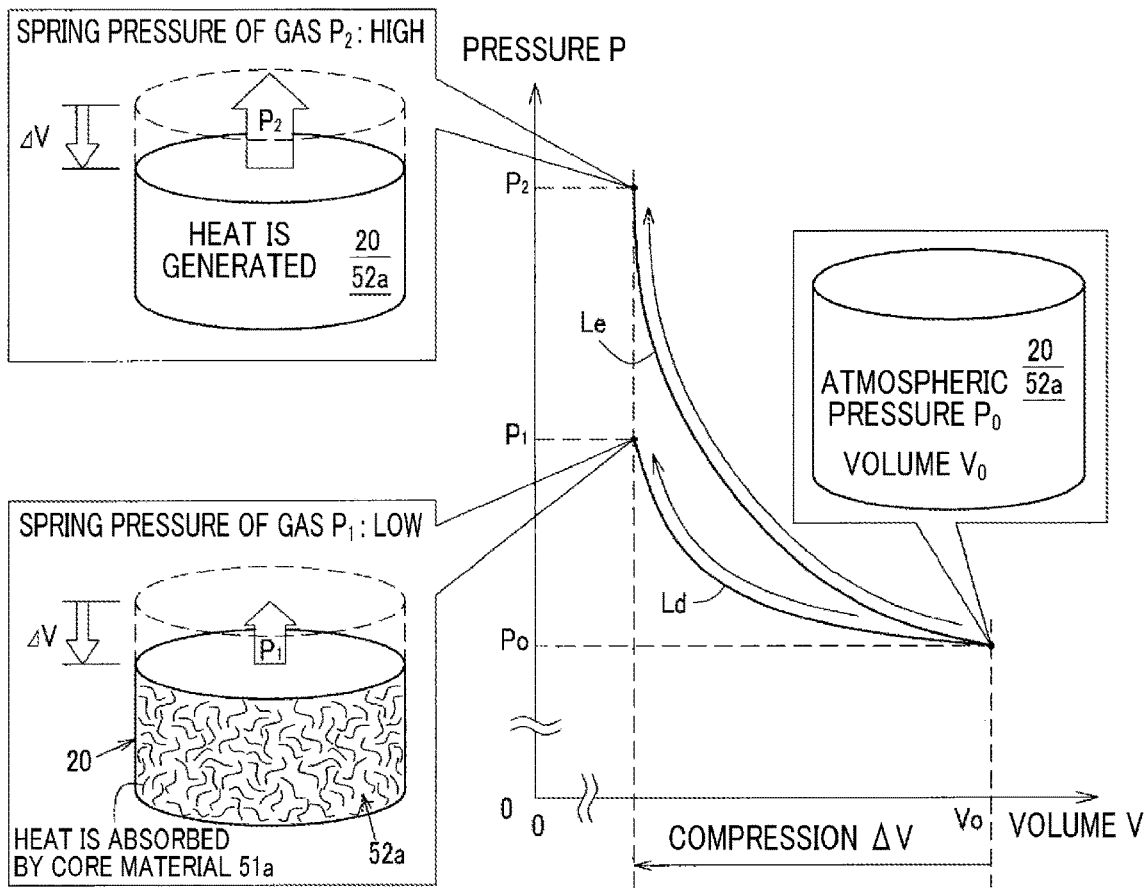
FIG. 4 is a diagram showing a difference in pressure change during compression of a closed cross-sectional portion between the presence and absence of a core material.

As a result, in the first embodiment, in which the core material 51a is enclosed in the closed cross-sectional portion 20, when the closed cross-sectional portion 20 is compressed by $\Delta V$ from $V_0$ as shown in, for example, FIG. 4, the closed cross-sectional portion 20 can be caused to undergo an isothermal change to the extent possible (see a waveform Ld in FIG. 4) compared to the case where the closed cross-sectional portion 20 undergoes an adiabatic change without absorption of heat by the core material 51a (see a waveform Le in FIG. 4), whereby an increase in the internal pressure P of the closed cross-sectional portion 2, i.e., an apparent increase in the effective elastic modulus of the core layer 50, can be reduced (see $P_1 < P_2$ in FIG. 4).

In other words, although not shown, when the closed cross-sectional portion 20 is compressed by the same pressure, the compression ratio is higher in the case where the core material 51a is enclosed in the closed cross-sectional portion 20 than in the case where the core material 51a is not enclosed in the closed cross-sectional portion 20. As can also be seen from this, the apparent increase in the effective elastic modulus of the core layer 50 can be further reduced in the case where the core material 51a is enclosed in the closed cross-sectional portion 20 than in the case where the core material 51a is not enclosed in the closed cross-sectional portion 20

Thus, in order to enhance the heat absorption of the core material 51a formed of a fibrous substance that is enclosed in the closed cross-sectional portion 20, the core material 51a is preferably formed to have a dense structure, i.e., the surface area of the core material 51a that is in contact with the gas 52a is preferably increased. In this example, the specific surface area (S/V) of the core material 51a, which is defined as the surface area (S) per unit volume (V), is set to 20,000 (mm²/cm³) or more.

Meanwhile, if the packing density of the core material 51a is increased in order to increase the specific surface area, the weight of the core material 51a increases. Therefore, the packing density of the core material 51a is set to 0.11 (g/cm³) or less.

In other words, in this example, the fiber thickness of the core material 51a is set to 3 (denier) or less in order to satisfy the conditions that the specific surface area is 20,000 (mm²/cm³) or more and the packing density is 0.11 (g/cm³) or less.

Here, the specific surface area (S/V) is represented by:

$$S/V = 1/(\rho \times \pi r^2) \times M/Vc \times 2\pi r \quad (3)$$

where $\rho$ represents the density (g/mm³) of the fiber, r represents the radius (mm) of the fiber, M represents the weight (g) of the fibers in the core layer, and Vc represents the volume (cm³) of the core layer.

How to derive Expression (3) will be briefly described.

As described above, the specific surface area (S/V) is defined as the surface area (S) of the core material 51a per unit volume (V). In other words, the specific surface area (S/V) is defined as "the length of the fiber per cm³"×"the outer peripheral length of the fiber" (A).

Here, "the length of the fiber per cm³" is "the length of the fiber per gram"× the packing density, where the packing density="the weight of the fibers in the core layer"/"the volume of the core layer") (B). Therefore, specifically, the specific surface area can be defined as "the length of the fiber per gram"×the packing density ב"the outer peripheral length of the fiber."

Here, "the length of the fiber per gram" is "the volume of the fiber per gram"/the cross-section of the fiber, where "the volume of the fiber per gram" is "the reciprocal of the density of the fiber" (C). Therefore, the specific surface area can be more specifically defined as 1/(the density of the fiber× the cross-section of the fiber)×the packing density× "the outer peripheral length of the fiber" (D).

Therefore, the specific surface area (S/V) can be represented by Expression (3) on the basis of the descriptions (A)-(D).

Note that the denier of the fiber may be used instead of the radius r of the fiber.

The denier (d) of the fiber is defined as the weight (g) of the fiber per 9,000 (m). and the relationship $d=\pi r^2 \times 900,000 \times \rho$ is established (E). Expression (3) can be represented using the denier by replacing r by $[d/(\pi \times 9,000 \times \rho)]^{1/2}$.

A specific method for calculating (specifying) the specific surface area will be described on the basis of the descriptions (A)-(E). For example, as shown in Case 1 of FIG. 12A, it is assumed that the core material is a felt that is formed of PET fibers of 6 denier, and has a packing density of 600 g/m² and a thickness of 10 mm.

Figures 12A, 12B:
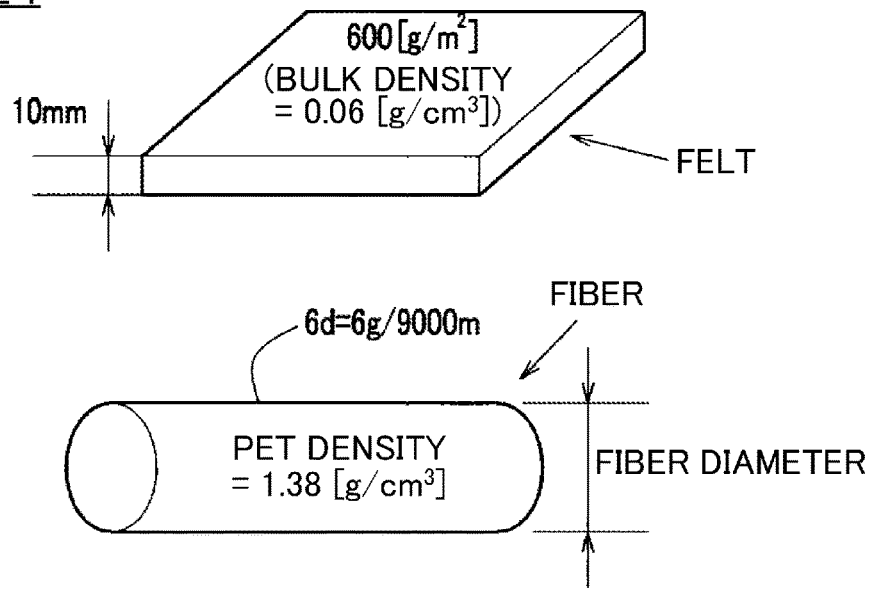
FIGS. 12A and 12B are a schematic diagram and a table, respectively, showing a specific example for describing a specific surface area.

The radius of a fiber of Case 1 shown in FIG. 12A is $r=[6/(\pi \times 9,000 \times 1.38)]^{1/2}=12.4$ μm according to the description (E). Incidentally, "the outer peripheral length of the fiber" is $2\pi r=0.078$ (mm). As can be seen from the description (C), "the volume of the fiber per gram," which is required in the calculation of "the length of the fiber per gram," is 724 mm³/g, which is calculated using the density of the fiber (known polyester density: 1.38 (g/cm³)). The cross-sectional area of the fiber is 0.0000483 (mm²), which is calculated using the radius r of the fiber. Based on these values, "the length of the fiber per gram" is 1,499 (m/g) according to the description (C).

Meanwhile, the felt of Case 1 has a packing density (M/V) of 600 (g)/(1 (m)×1 (m)×0.01 (m))=0.06 (g/cm³). Therefore, "the length of the fiber per unit volume" (90,000 (mm/cm³)) of the felt can be calculated by multiplying the value (0.06 (g/cm³)) of the packing density (M/V) by the value (1,499 (m/g)) of "the length of the fiber per gram" according to the description (B).

The specific surface area (7,020 (mm²/cm³)) can be calculated using the value (90,000 (mm/cm³)) of "the length of the fiber per unit volume" of the felt, and the value (0.078 (mm)) of "the outer peripheral length of the fiber" calculated above, according to the description (A).

Thus, in Case 1 of FIG. 12A, the specific surface area is 7,020 (mm²/cm³). For example, as in Case 2 shown in a table of FIG. 12B, even when the same type of fiber (the same fiber density) is used, and the core layer has the same packing density, if the diameter of the fiber is reduced (e.g., 6 d (24.8 μm)→0.6 d (7.84 μm)), the specific surface area can be set to 20,000 (mm²/cm³) or more.

Next, the reason why the specific surface area of the core material 51a is set to 20,000 (mm²/cm³) or more will be specifically described with reference to FIGS. 5A, 5B, 5C, and 6.

Figure 5A:
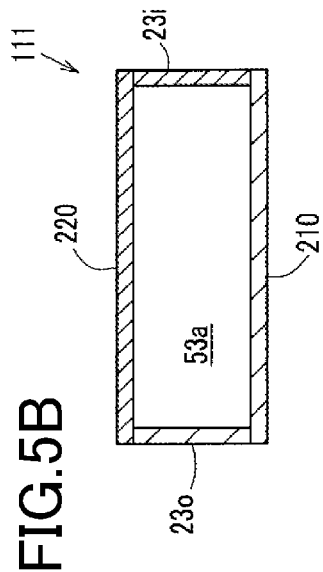
FIGS. 5A and 5B are diagrams schematically showing an experimental example according to the first embodiment and Conventional Example 3, respectively.

FIG. 5A is a schematic diagram of a double-wall panel 5A according to an experimental example of the present invention that is a variation of the double-wall panel 5 of the first embodiment. In the double-wall panel 5A, the outer wall 210 is formed of an iron sheet, the inner wall 220 is formed of a resin sheet, and the core material 51a is formed of a fibrous substance having a specific surface area of 20,000 (mm²/cm³). The core material 51a is separated from the inner wall 220 by a gap S, while the core material 51a is in contact with the outer wall 210.

Figure 5B:
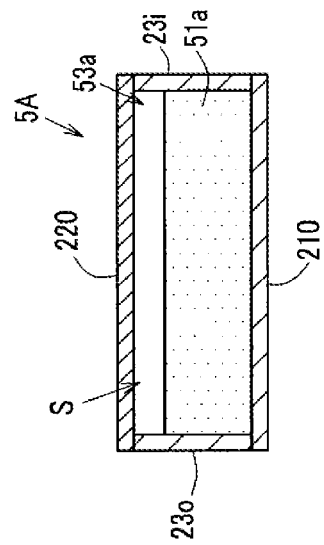

FIG. 5B shows a conventional example double-wall panel 111 in which air 53a is enclosed, instead of the core material 51a, between the outer wall 210 formed of an iron sheet and the inner wall 220 formed of a resin sheet.

Figure 5C:
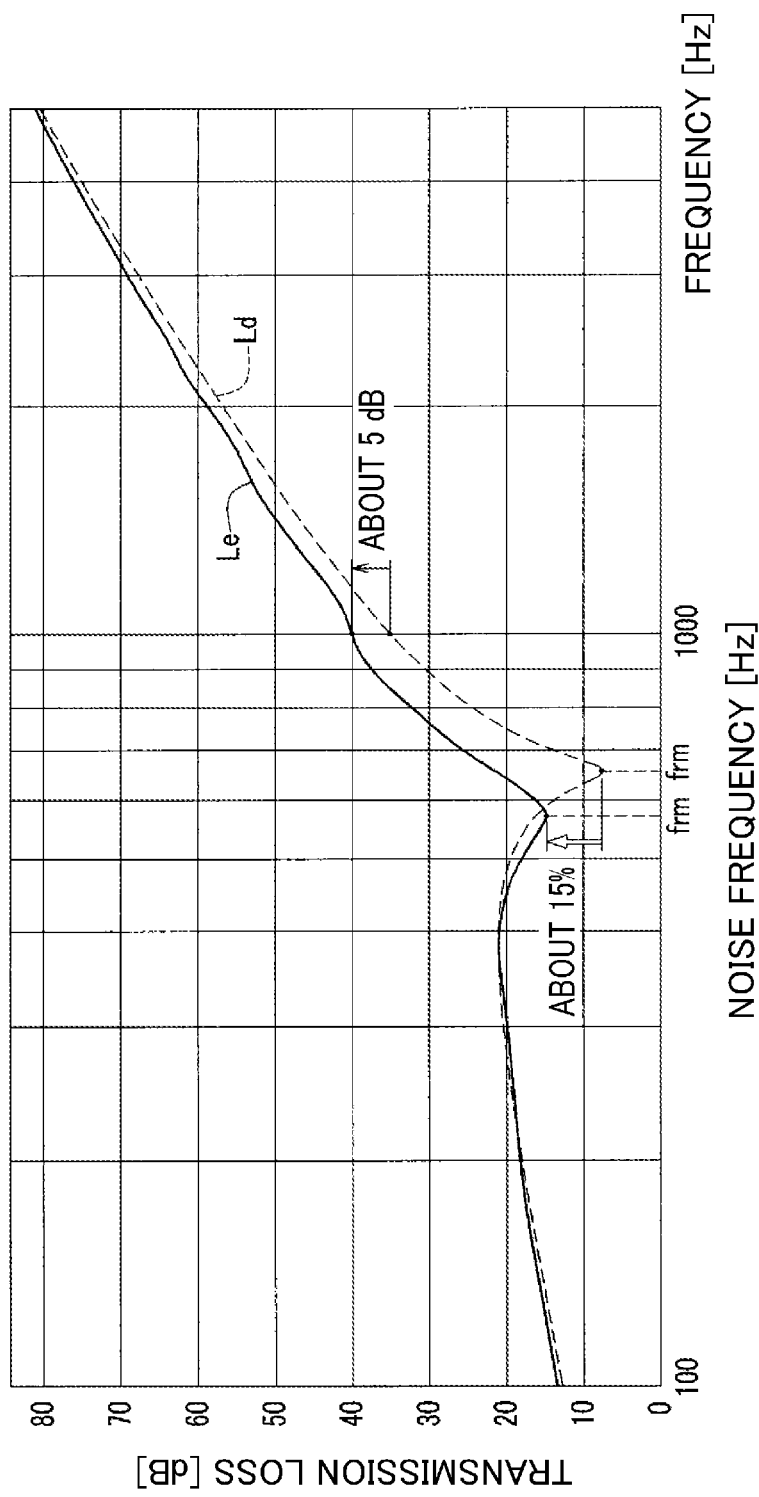
FIG. 5C is a diagram showing a relationship between the transmission losses of the experimental example of the first embodiment and Conventional Example 3, and the frequency of noise.

FIG. 5C is a diagram showing a relationship between the road noise transmission loss of the double-wall panels and the frequency of noise. In FIG. 5C, a waveform Le is of the experimental example (see FIG. 5A) of the present invention, ad a waveform Ld is of the conventional example (see FIG. 5B).

Incidentally, as shown in FIG. 5C, the transmission loss of the experimental example of the present invention with respect to noise having a frequency of, for example, 1,000 Hz is improved by about 5 dB compared to the conventional example. In addition, the transmission loss of the experimental example of the present invention with respect to the resonant frequency $f_{rm}$ is improved by about 15% compared to the transmission loss of the conventional example with respect to the resonant frequency $f_{rm}$.

Figures 6, 7:
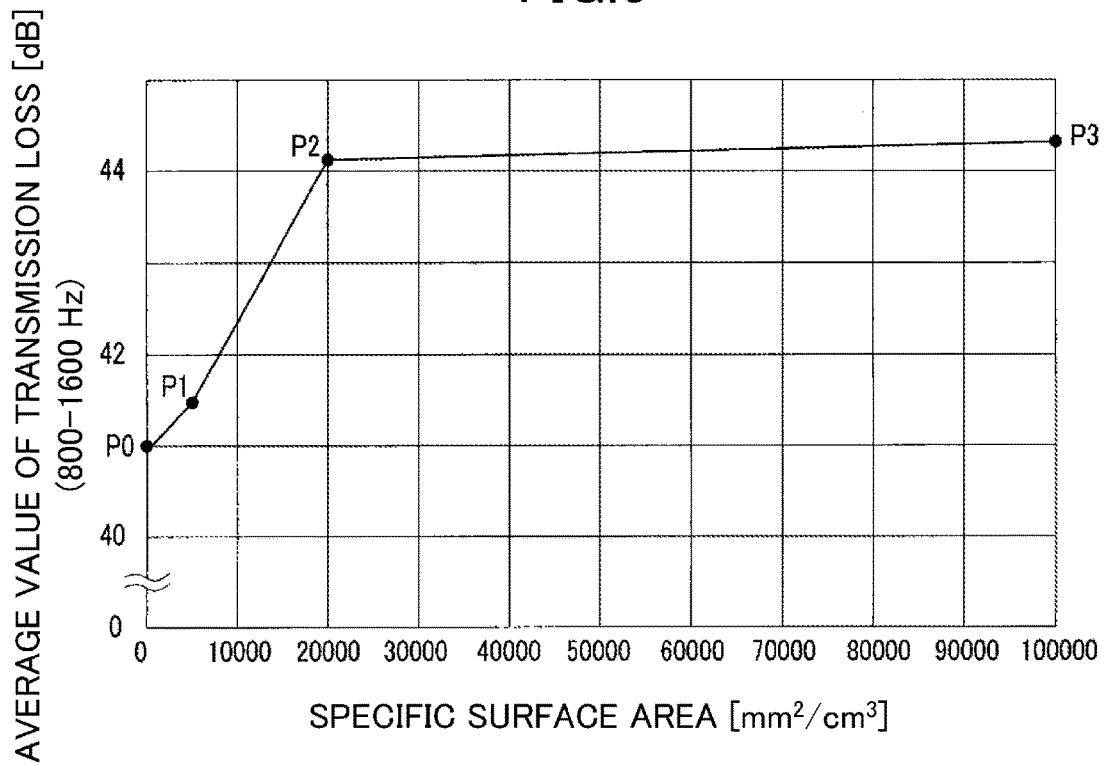
FIG. 6 is a diagram showing a relationship between the average value of transmission loss in a predetermined region of noise frequency, and the specific surface area of a core material.
FIG. 7 is a table showing a relationship between the packing density of a core material having a specific surface area of 20,000 $(mm^2/cm^3)$, and the mass per unit volume of a double-wall panel.

FIG. 6 is a graph showing a relationship between the average value of transmission loss with respect to road noise (800-1600 Hz) and the specific surface area of the core material 51a formed of a fibrous substance.

In FIG. 6, points P0 and P2 indicate the average values of road noise transmission loss that are calculated from the waveforms Ld and Le, respectively, of FIG. 5C. The point P0 indicates the average value of the conventional example (see FIG. 5B). The point P2 indicates the average value of the experimental example (see FIG. 5A) in which the core material 51a has a specific surface area of 20,000 (mm²/cm³).

In FIG. 6, points P1 and P3 indicate average values that are obtained when the core material 51a has a specific surface area of 5,000 and 100,000 (mm²/cm³), respectively. These average values are calculated in a manner similar to that is used for the points P0 and P2.

Here, the double-wall panel 5 of the first embodiment is intended to achieve a transmission loss of about 50-55 dB with respect to road noise in a frequency region (800-1600 Hz) that includes frequencies of noise unpleasant to a passenger.

In order to achieve this, it is necessary to ensure that the average value of road noise transmission loss is increased to at least about 44 dB by employing the spring elastic modulus decreasing means 1.

As can be seen from FIG. 6, in order to achieve the road noise transmission loss of about 44 dB or more by employing the spring elastic modulus decreasing means 1, it is necessary to set the specific surface area of the core material 51a formed of a fibrous substance to 20,000 (mm²/cm³) or more. Therefore, in this example, as described above, the specific surface area of the core material 51a formed of a fibrous substance is set to 20,000 (mm²/cm³) or more.

Next, the reason why the packing density of the core material 51a is set to 0.11 (g/cm³) or less will be specifically described with reference to a table shown in FIG. 7.

The table of FIG. 7 shows a relationship between the packing density of the core material 51a and the mass per unit area of a double-wall panel, in the case where the specific surface area of the core material 51a is set to 20,000 (mm²/cm³).

In the table of FIG. 7, all double-wall panels according to a comparative example and Examples 1-3 of the first embodiment include the inner wall 22 (upper panel), the outer wall 21 (lower panel), and the core material 51a enclosed therebetween. In all of the panels, the specific surface area of the core material 51a is set to 20,000 (mm$^2$/cm$^3$). The packing density of the core material 51a of each panel is set to a value shown in the table of FIG. 7.

Incidentally, a rough calculation indicates that the mass per unit area of an existing car body floor including a lower cover (thickness t: 0.6 mm, iron) and an interior mat and excluding a reinforce is 10,700 (g/m$^2$).

In the first embodiment, while the specific surface area of the core layer 50 is set to 20,000 (mm$^2$/cm$^3$) or more in order to increase the transmission loss, the need to reduce the mass of the car body floor compared to the existing car body floor is satisfied.

As shown in the table of FIG. 7, in the case of the comparative example, the specific surface area of the core layer 50 is 20,000 (mm$^2$/cm$^3$), and the packing density of the core layer 50 is, for example, 0.3 (g/cm$^3$), which is higher than 0.11 (g/cm$^3$). In this case, as shown in the table, the mass per unit area of the car body floor is greater than or equal to that of the existing car body floor (15,840>10,700 (g/m$^2$)).

In contrast to this, as shown in the table of FIG. 7, in the case of Example 1, the specific surface area of the core layer 50 is 20,000 (mm$^2$/cm$^3$), and the packing density of the core layer 50 is 0.11 (g/cm$^3$), i.e., the fiber diameter of the core material 51a is 3 (denier). In this case, as shown in the table, the mass per unit area of the car body floor is smaller than that of the existing car body floor (10,140<10,700 (g/m$^2$)).

Similarly, in the case of Examples 2 and 3 shown in the table of FIG. 7, the specific surface area of the core layer 50 is 20,000 (mm$^2$/cm$^3$) and the packing density of the core layer 50 is lower than 0.11 (g/cm$^3$), i.e., the fiber diameter of the core material 51a is smaller than 3 (denier). In this case, as shown in the table, the mass per unit area of the car body floor is smaller than that of the existing car body floor.

Incidentally, if the fiber diameter of the core material 51a is set greater than 3 (denier) and the packing density of the core layer 50 is maintained at 0.11 (g/cm$^3$), the specific surface area is smaller than 20,000 (mm$^2$/cm$^3$), and therefore, the above need is not satisfied.

Japanese Patent Publication No. 2001-242873 (paragraph) describes experimental example 2 in which a fibrous substance has an average thickness of 15 (denier) and a packing density of 0.021 (g/cm$^3$).

Meanwhile, as can be seen from Example 3 shown in the table of FIG. 7, in order to set the specific surface area of the core layer 50 to 20,000 (mm$^2$/cm$^3$) or more in the case where the packing density of the core layer 50 is 0.024 (g/cm$^3$), close to 0.021 (g/cm$^3$), it is necessary to set the fiber diameter of the core material 51a to 0.1 (denier) or less.

Specifically, in experimental example 2 of Japanese Patent Publication No. 2001-242873, the packing density of the fibrous substance is 0.11 (g/cm$^3$) or less, i.e., the fibrous substance has a light weight, but the fibrous substance has an extremely great average thickness (15>0.1 (denier)), and therefore, the specific surface area is much smaller than 20,000 (mm$^2$/cm$^3$). Thus, there is room for improvement in terms of increase of transmission loss.

With the above in mind, the double-wall panel 5 of the first embodiment is configured so that the specific surface area of the core layer 50 is 20,000 (mm$^2$/cm$^3$) or more, and the packing density of the core material 51a is 0.11 (g/cm$^3$) or less.

As shown in the table of FIG. 7, in Example 2, the mass per unit area of the car body floor can be reduced by about 20 percent (=(10,700−8,740)/10,700×100), compared to the existing car body floor. In addition, in Example 2, the fiber diameter of the core material 51a is 0.6 (denier). The core material 51a having a fiber diameter of 0.6 (denier) can be implemented into practice. Meanwhile, if the fiber diameter of the core material 51a is smaller than 0.1 (denier), the manufacturing cost increases.

Therefore, the fiber diameter of the core material 51a is preferably 0.1-3 (denier), more preferably 0.1-0.6 (denier).

In another embodiment, the core material 51a may be formed of a foam substance having gas permeability instead of the above fibrous substance. The foam substance may have, for example, an open-cell structure in which bubbles of polyurethane or porous rubber, etc., connect to each other.

In a double-wall panel (not shown) in which the core material 51a is formed of a foam substance, if the specific surface area of the core layer 50 is set to 20,000 (mm$^2$/cm$^3$) or more, and the packing density of the core material 51a is set to 0.11 (g/cm$^3$) or less, i.e., the thickness (diameter) of a framework (branch-shaped wall) of the foam substance is set to 3-7 (μm), which is equivalent to 0.1-0.6 (denier), which is the thickness of fibers required for the core material 51a formed of a fibrous substance, the road noise transmission loss can preferably be increased to about 44 dB or more by employing the spring elastic modulus decreasing means 1.

((2A-2) Spring Elastic Modulus Decreasing Means 2)

As the spring elastic modulus decreasing means 2, a configuration can be employed in which a gas 52a that has a lower bulk modulus E than that of air in a stationary state is enclosed in the closed cross-sectional portion 20 (the core layer 50), in order to reduce the bulk modulus E of the core layer 50.

Figure 8:
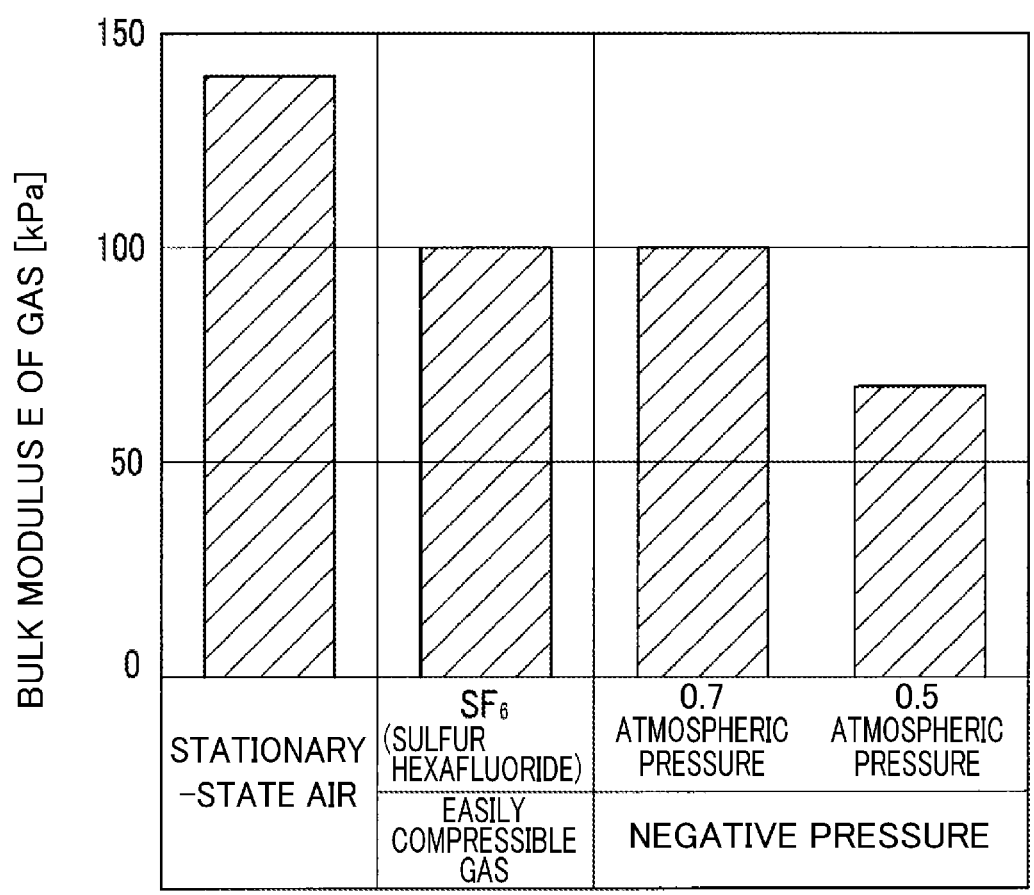
FIG. 8 is a bar graph showing the bulk modulus of stationary-state air and the bulk modulus of a gas lower than that of air.

As shown in a graph of FIG. 8, stationary-state air has a bulk modulus E of about 140 (kPa), and the bulk modulus E of the gas 52a in the core layer 50 of the first embodiment is set lower than the bulk modulus E of stationary-state air. Note that the bulk modulus E of a substance (in this example, the gas 52a) indicates how difficult the substance is to compress.

Specifically, in the double-wall panel 5 of the first embodiment, the gas 52a that is easier to compress than stationary-state air, i.e., sulfur hexafluoride (SF$_6$) gas as an easily compressible gas, is enclosed in the closed cross-sectional portion 20 (the core layer 50).

As a result, as shown in the graph of FIG. 8, the bulk modulus E of the gas 52a in the core layer 50 can be reduced to about 100 (kPa), which is lower than the bulk modulus E of stationary-state air (about 140 (kPa)).

Thus, the reduction in the bulk modulus E of the gas 52a in the core layer 50 can contributes to a decrease in the spring elastic modulus k of the core layer 50.

As described above, the decrease in the spring elastic modulus k of the core layer 50 can reduce the resonant frequency $f_{rm}$ of the double-wall panel 5. Therefore, as a result of employing the spring elastic modulus decreasing means 2, a transmission loss of about 40 (dB) can be obtained with respect to the frequency region of road noise.

Note that the easily compressible gas is not limited to sulfur hexafluoride (SF$_6$), and may, for example, be a hydrochlorofluorocarbon (HCFC) or hydrofluorocarbon (HFC), which is easily converted into gas when compressed.

In the above embodiment, an easily compressible gas is enclosed in the closed cross-sectional portion 20 in order to set the bulk modulus E of the gas 52a in the core layer 50 to a value lower than the bulk modulus E (about 140 (kPa)) of stationary-state air. The present disclosure is not limited to this. The bulk modulus E and the pressure (air pressure) have a linear relationship. Therefore, for example, air having a negative pressure may be enclosed as the gas 52a in the closed cross-sectional portion 20 (the core layer 50).

Specifically, as shown in the graph of FIG. 8, if air having a negative pressure of, for example, 0.7 atmosphere is enclosed in the closed cross-sectional portion 20, the bulk modulus E of the gas 52a in the core layer 50 can be reduced to about 100 (kPa), which is substantially the same as when sulfur hexafluoride is enclosed as an easily compressible gas.

In addition, as shown in the graph of FIG. 8, if air having a negative pressure of, for example, 0.5 atmosphere is enclosed in the closed cross-sectional portion 20, the bulk modulus E of the gas 52a in the core layer 50 can be reduced to about 70 (kPa), which is lower than when sulfur hexafluoride is enclosed as an easily compressible gas.

Thus, if air having a negative pressure is enclosed in the closed cross-sectional portion 20, an effect equivalent to or better than when an easily compressible gas is enclosed in the closed cross-sectional portion 20 can be obtained without using a special gas 52a that is an easily compressible gas.

As described above, the double-wall panel 5 of the first embodiment is configured to have both the spring elastic modulus decreasing means 1 that exploits the heat absorption effect of the core material 51a, and the spring elastic modulus decreasing means 2 that causes the bulk modulus E ($\rho c^2$) of the gas 52a in the core layer 50 to be lower than the bulk modulus E of stationary-state air, whereby the spring elastic modulus k of the core layer 50 can be significantly reduced, resulting in a significant increase in transmission loss with respect to a frequency region corresponding to road noise.

In addition, the spring elastic modulus decreasing means 2 allows a reduction in the heat absorption performance of the core material 51a formed of a fibrous substance or foam substance in the spring elastic modulus decreasing means 1, and therefore, the range of options of the core material 51a can be proportionately increased. Meanwhile, the spring elastic modulus decreasing means 1 allows a reduction in the decrease of the bulk modulus E of the gas 52a in the core layer 50 in the spring elastic modulus decreasing means 2, and therefore, the range of options of the easily compressible gas can be proportionately increased, or the negative pressure of air can be proportionately increased (i.e., air having a pressure closer to the atmospheric pressure can be used), for example.

Note that the double-wall panel 5 of the first embodiment may not have both of the spring elastic modulus decreasing means 1 and 2, and may have only one of them.

(2B) Stiffness Ratio of Inner and Outer Walls, Etc.

Next, of the two points to which attention has been paid in order to increase the road noise transmission loss to the extent possible using the double-wall panel 5, the latter point (a relationship in stiffness ratio between the inner and outer walls 21 and 22, etc.) will be described.

As described above, in the double-wall panel 5 of this example, the outer wall 21 has a stiffness (bending stiffness) lower than or equal to that of PP (1500 MPa or less), and the inner wall 22 has a stiffness (bending stiffness) higher than or equal to that of glass fiber-reinforced resin (3 GPa or more), whereby the stiffness of the outer wall 21 is lower than the stiffness of the inner wall 22.

With the above configuration, when road noise enters the double-wall panel 5 through the outer wall 21, the kinetic energy of gas particles (gas molecules) in the gas layer 52 can be damped with higher efficiency, and therefore, the road noise transmission loss can be increased.

The mechanism of this effect that is achieved by the feature that the stiffness of the outer wall 21 is lower than the stiffness of the inner wall 22, will be described with reference to FIGS. 9A, 9B, and 9C.

Figure 9A:
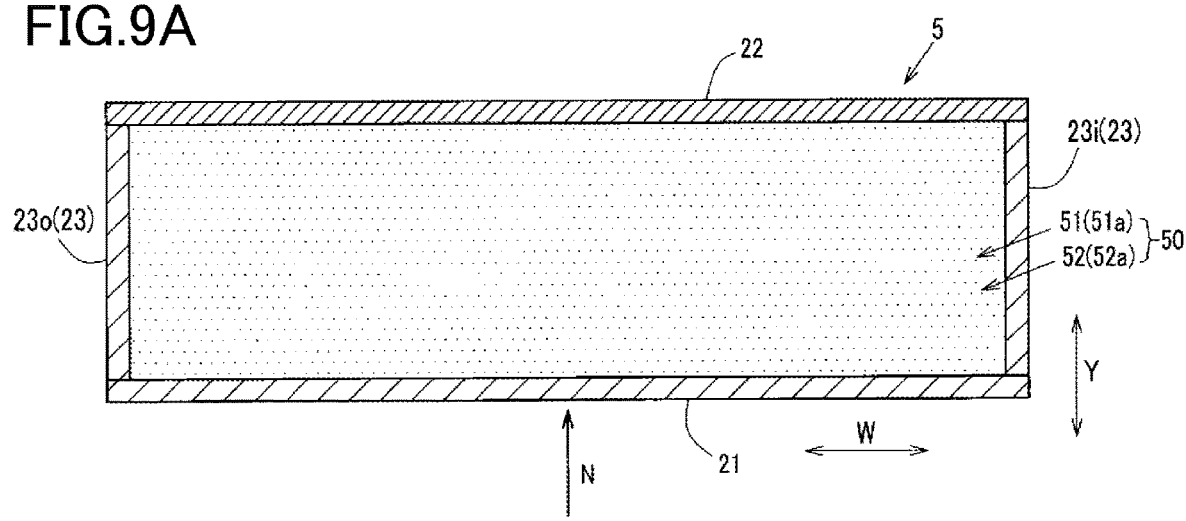
FIGS. 9A-9C are schematic diagrams for describing the mechanism of a double-wall panel in which the stiffness of an outer wall is lower than the stiffness of an inner wall.
Figure 9B:
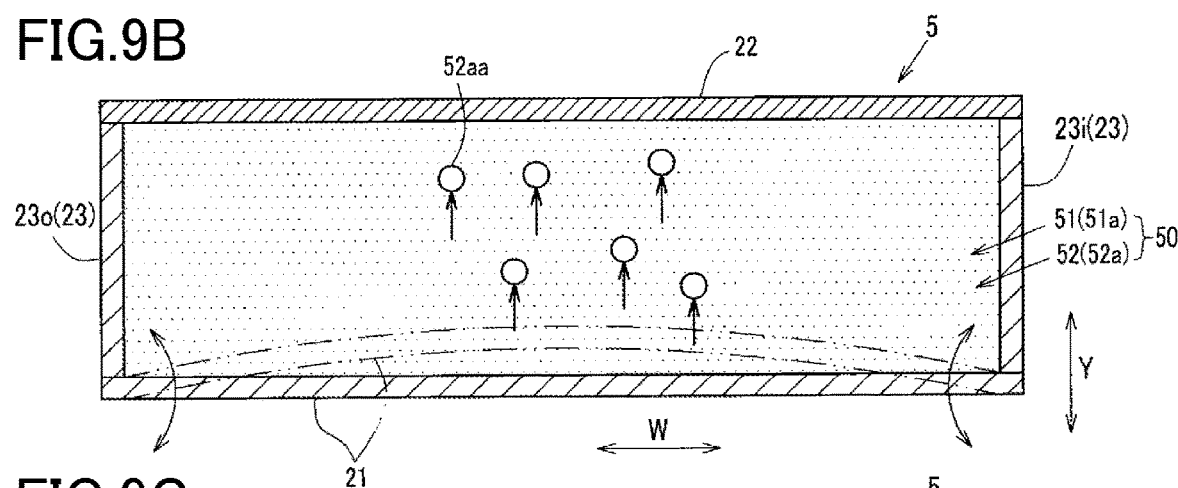
Figure 9C:
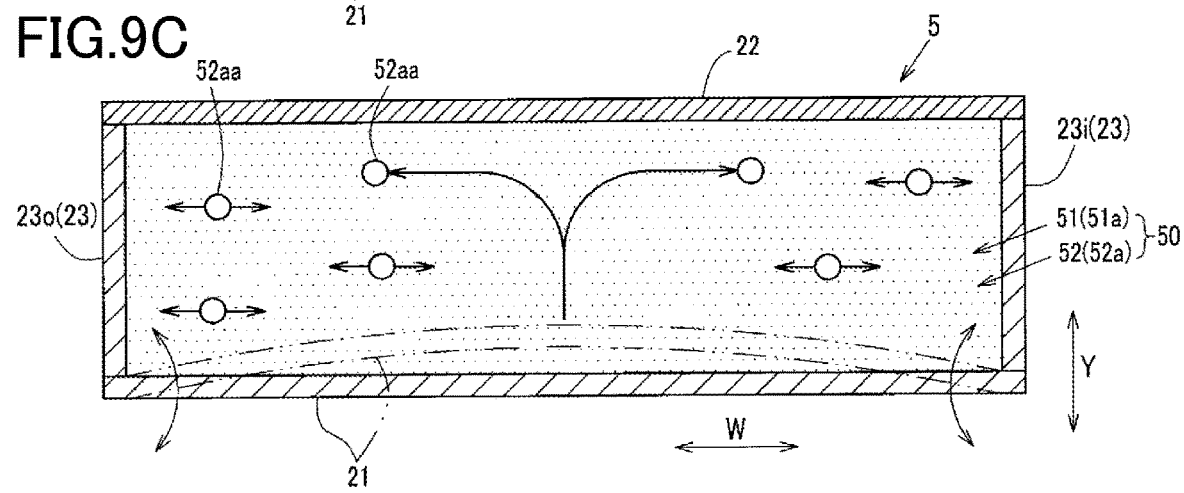

FIGS. 9A, 9B, and 9C are cross-sectional views schematically showing the double-wall panel 5 of the first embodiment for describing the mechanism. FIGS. 9A, 9B, and 9C show states of the double-wall panel 5 that occur before, upon, and after, respectively, the noise N enters the double-wall panel 5.

If the stiffness of the outer wall is high, the vibration of the outer wall is not likely to be induced due to the noise N entering thereinto, and the noise N entering the double-wall panel through the outer wall is likely to reach the interior of a car through the core layer and the inner wall without being damped.

In contrast to this, in the case where the outer wall 21 has a low stiffness as in the first embodiment, the outer wall 21 can be caused to more actively vibrate due to the noise N entering the double-wall panel 5 through the outer wall 21, as shown in FIGS. 9A and 9B (see the outer wall 21 indicated by an imaginary line in FIG. 9B).

When the outer wall 21 thus vibrates, the outer wall 21 is deformed and bent into a convex shape toward the closed cross-sectional portion 20 (see the outer wall 21 indicated by an imaginary line in FIG. 9B), the energy of sound (the kinetic energy of gas molecules 52aa (air molecules) due to transmission of sound) that is transmitted in the core layer 50 from the outer wall 21 toward the inner wall 22 (upward) is transmitted in in-plane directions W (directions perpendicular to the thickness direction of the double-wall panel 5) as shown in FIG. 9C, instead of being transmitted directly toward the interior of a car.

In other words, when the outer wall 21 is deformed and bent into a convex shape toward the closed cross-sectional portion 20, the gas molecules 52aa in the core layer 50 are compressed in a thickness direction Y (vertical direction) to actively collide the inner wall 22. As a result, as shown in FIG. 9C, the gas molecules 52aa compressed in the thickness direction Y collide the inner wall 22 and then diffuse in the in-plane directions W, i.e., the motion toward the inner wall 22 is converted into the motion in the in-plane directions W.

Thus, when the noise N enters the double-wall panel 5 through the outer wall 21, the outer wall 21 is induced to vibrate due to its low stiffness, and the vibration of the outer wall 21 causes the motion of the gas molecules 52aa in the core layer 50 in the in-plane directions W (FIG. 9C shows only the car transverse direction).

Because the closed cross-sectional portion 20 is hermetically enclosed, the motion in the in-plane directions W of the gas molecules 52aa in the core layer 50 causes friction between the gas molecules 52aa (particles) and the core material 51a formed of a fibrous substance, so that the energy of sound is converted into thermal energy, i.e., the energy of sound can be damped. This makes it more difficult for the noise N to penetrate through the double-wall panel 5 and reach the interior of a car.

Note that in the above description of the mechanism, it is assumed for the sake of simplicity that the vibration of the outer wall 21 due to the incident noise N is a fundamental vibration, having a single crest or trough (half the wavelength). The present disclosure is not limited to this. The vibration of the outer wall 21 may be an n-th harmonic vibration (n is a natural number of two or more). In this case, the same effect can be achieved.

As described above, in this example, the vertical walls 23 (23o and 23i) are mostly formed of the same PP material as that of the outer wall 21.

Here, in general, when sound is transmitted through a solid material, such as a panel, the sound is more damped as the stiffness of the solid material decreases. Therefore, for example, if the vertical wall 23 is mostly formed of a material having a lower stiffness than that of the inner wall 22, such as PP having the same stiffness as that of the outer wall 21, sound that is transmitted through the vertical wall 23 to reach the interior of a car can be more effectively damped.

Although, in the above example, the vertical wall 23 is mostly formed of a material having a lower stiffness than that of the inner wall 22, the present disclosure is not limited to this. Alternatively, the vertical wall 23 may be formed of a material having a higher stiffness than that of the outer wall 21. For example, the vertical wall 23 may be formed of a material having a stiffness similar to that of the inner wall 22.

In the case where the vertical wall 23 is thus mostly formed of a material having a higher stiffness than that of the outer wall 21 (not shown), the support (linking) stiffness between the outer wall 21 and the inner wall 22 can be increased.

In the double-wall panel 5 of the first embodiment, in which the stiffness of the outer wall 21 is lower than that of the inner wall 22, the outer wall 21 and the inner wall 22 have the same mass.

As can be seen from the relationship between $m_e$, and $m_1$ and $m_2$, that is represented by Expression (2), if the mass ratio of the outer wall 21 to the inner wall 22 is 1:1 as described above, the effective surface density $m_e$ can be maximized. In addition, as can be seen from the relationship between $f_{rm}$ and $m_e$ represented by Expression (1), the maximization of the effective surface density $m_e$ can contribute to a decrease in the resonant frequency $f_{rm}$ of the double-wall panel 5.

Therefore, as described above, if the outer wall 21 and the inner wall 22 have the same mass while the stiffness of the outer wall 21 is lower than the stiffness of the inner wall 22, both the mass ratio and stiffness ratio of the outer wall 21 to the inner wall 22 can contribute to an increase in the road noise transmission loss.

In addition, in the first embodiment, as described above, the fiber direction of the core material 51a formed of a fibrous substance is substantially parallel to the wall surface 21a (panel surface) of the outer wall 21 (see the enlarged view of the X portion in FIG. 1), and therefore, the vibration of the outer wall 21 caused by the noise N entering the double-wall panel 5 through the outer wall 21 is not disturbed by the core material 51a formed of a fibrous substance contained in the closed cross-sectional portion 20 (i.e., the vibration of the outer wall 21 is less damped). As a result, the outer wall 21 can actively vibrate, whereby the effect of damping the kinetic energy of gas molecules contained in the gas layer 52 can be enhanced.

As described above, in the double-wall panel 5 of the first embodiment, the wall-to-wall distance (the gap between the outer wall 21 and the inner wall 22) is in the range of 15-30 mm across the panel in all in-plane directions W.

Figure 10A:
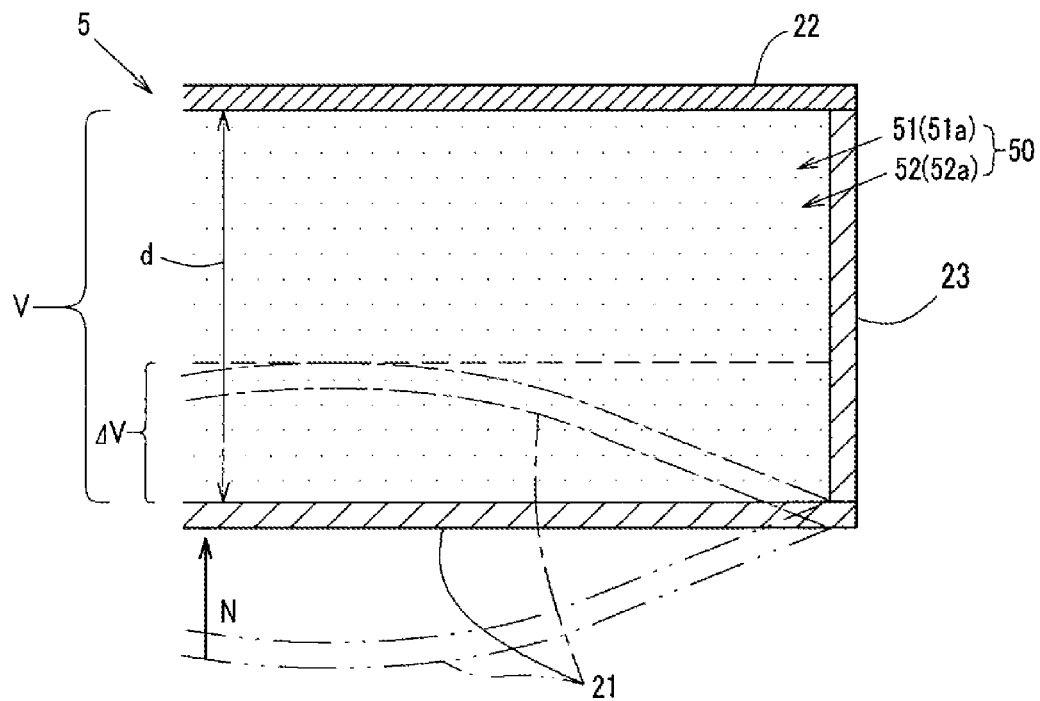
FIG. 10A is a diagram schematically showing the vibration of an outer wall due to incident noise.

Here, as shown in FIG. 10A, when the noise N enters the double-wall panel 5 through the outer wall 21, the closed cross-sectional portion 20 is compressed at a compression ratio ($\Delta V/V$), where V represents the volume of the closed cross-sectional portion 20, and $\Delta V$ represents a decrease in the volume of the closed cross-sectional portion 20 caused by the depression or displacement of the outer wall 21 into the closed cross-sectional portion 20. The compression ratio ($\Delta V/V$) of the closed cross-sectional portion 20 corresponds to the spring elastic modulus k of the core layer 50 (how easily the core layer 50 is compressed). The relationship between the compression ratio ($\Delta V/V$) and the wall-to-wall distance (d) is shown in a graph of FIG. 10B.

Figure 10B:
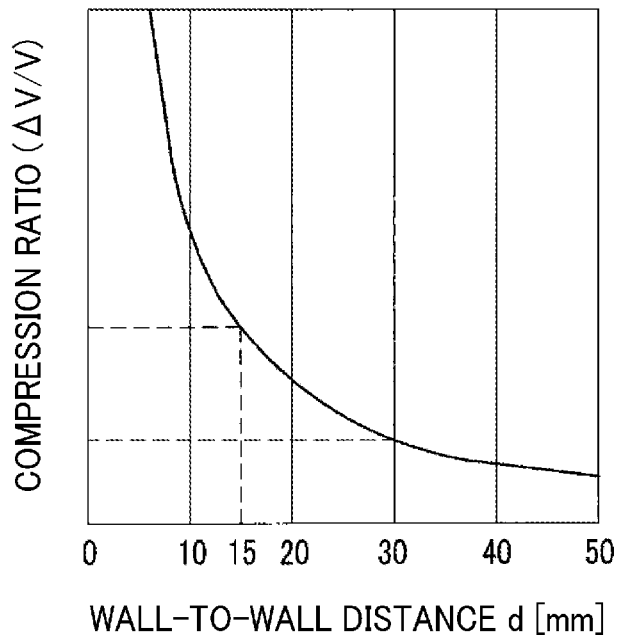
FIG. 10B is a diagram showing a relationship between the compression ratio and wall-to-wall distance of a closed cross-sectional portion when compressed due to the vibration of an outer wall.

As can be seen from Expression (1), as the spring elastic modulus k of the core layer 50 (the compression ratio ($\Delta V/V$) of the closed cross-sectional portion 20) decreases, the resonant frequency $f_{rm}$ decreases, resulting in a contribution to an increase in the road noise transmission loss, and meanwhile, as shown in FIG. 10B, the wall-to-wall distance (d) of the double-wall panel 5 increases.

Therefore, in this example, in order to enhance the sound insulating properties of the double-wall panel 5 to the extent possible while limiting the thickness of the double-wall panel 5 to the practical range, the wall-to-wall distance d of the double-wall panel 5 is set in the range of, for example, 15-30 mm, as described above.

In addition, in the double-wall panel 5 of the first embodiment, if the outer wall 21 and the inner wall 22 are configured to have the above stiffness ratio and mass ratio, the average value of the road noise transmission loss with respect to the frequency region of 800-1600 Hz can be increased to about 44 dB.

If modifications are thus made as to all of the above two points ((2A) the spring elastic modulus k of the core layer 50 and (2B) the stiffness ratio, etc., of the inner and outer walls 21 and 22), i.e., the spring elastic modulus decreasing means 1 and 2 are employed, and the stiffness of the outer wall 21 is set lower than the stiffness of the inner wall 22, the average value of the road noise transmission loss with respect to the frequency region of 800-1600 Hz can be increased to, for example, about 50-55 dB in the double-wall panel 5 of the first embodiment, as indicated by a waveform Lc of FIG. 3.

In Conventional Examples 1 and 2 of FIG. 14A, the panels 101,102, and W1-W3, and the closed cross-sectional portion 103A have separate functions. In contrast, in the double-wall panel 5 of the first embodiment of FIG. 2C, these functions are integrated together, and therefore, the panel thickness can be reduced to about half the thickness of Conventional Example 1.

Figure 2C:
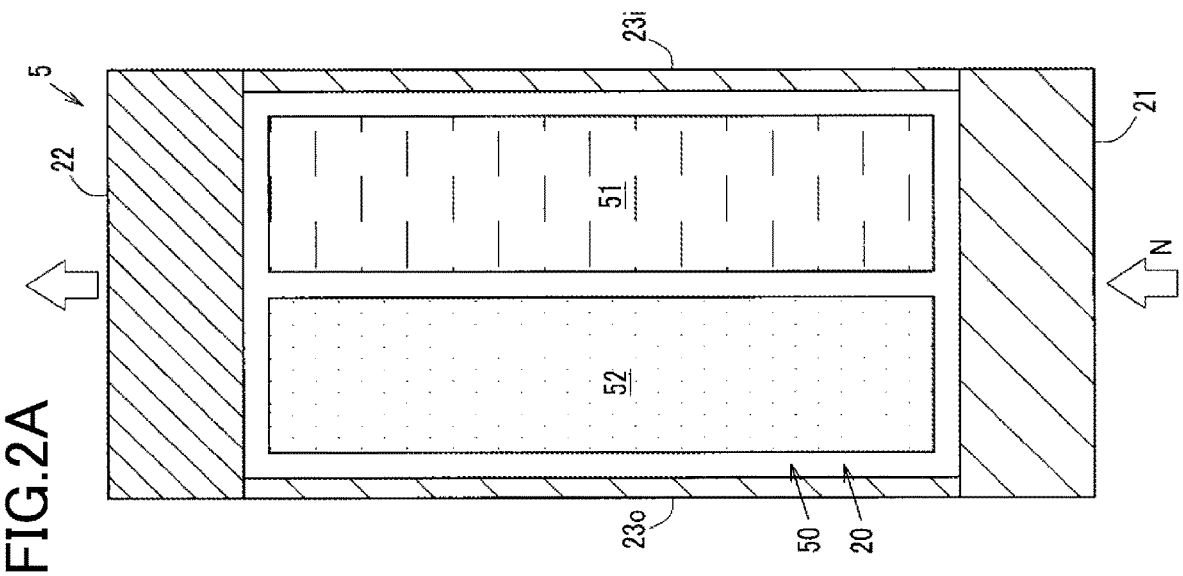

Note that the waveform Lc of FIG. 3 is of the double-wall panel 5 of the first embodiment, and FIG. 2C is a schematic diagram of the double-wall panel 5 of the first embodiment for comparison with FIGS. 14A and 14B.

The present disclosure is not limited only to the configuration of the above embodiment, and can be carried out in various other embodiments.

Figure 11:
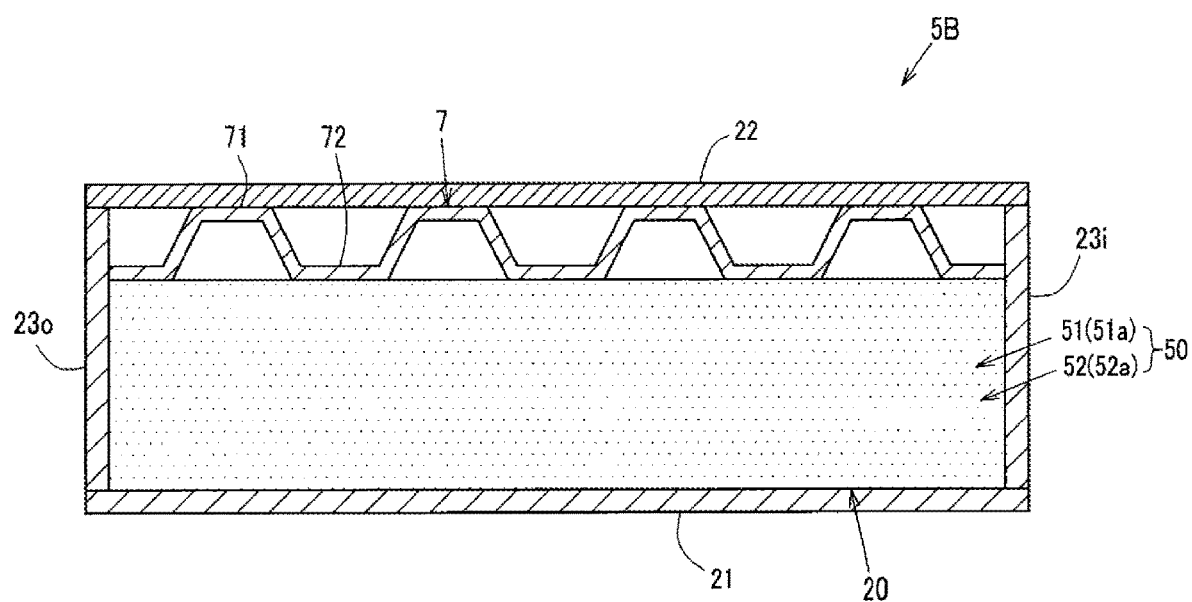
FIG. 11 is a cross-sectional view showing a variation of the first embodiment.

For example, FIG. 11 schematically shows a double-wall panel 5B as a variation of the first embodiment. In the double-wall panel 5B, a honeycomb material 7 that is a stiff material having a stiffness higher than or equal to the stiffness of the inner wall 22 may be interposed between the core material 51a formed of a fibrous substance and the inner wall 22. Specifically, in this variation of the first embodiment, the core layer 50 including the core material 51a formed of a fibrous substance is disposed in a portion of the closed cross-sectional portion 20 closer to the outer wall 21, and the honeycomb material 7 is disposed in a portion of the closed cross-sectional portion 20 closer to the inner wall 22.

The honeycomb material 7 is formed of a steel sheet having, on a surface thereof, a honeycomb structure including hexagonal concave portions 71 and hexagonal convex portions 72 adjoining each other without a gap.

With the above configuration, the honeycomb material 7 disposed in a portion of the closed cross-sectional portion 20 closer to the inner wall 22 can increase the stiffness of such a portion.

In addition, the core layer 50 disposed in a portion of the closed cross-sectional portion 20 closer to the outer wall 21 can enhance the above advantage that is provided by the outer wall 21 having a lower stiffness than that of the inner wall 22, i.e., can increase the motion of air in the core layer 50 caused by the vibration of the outer wall 21 when sound enters through the outer wall 21, and thereby accelerate the conversion of the energy of sound into kinetic energy, resulting in an improvement in the sound damping effect.

Note that the stiff material is not limited to the honeycomb material 7, and may be one that has a stiffness higher than or equal to that of the inner wall 22. For example, although not shown, the stiff material may be one that has a base portion, and a plurality of concave or convex ribs that are disposed on the base portion, facing the inner wall 22.

The double-wall panel 5 of the first embodiment is formed, by blow molding, etc., into a hollow shape having the closed cross-sectional portion 20 (hollow portion). The production method for the double-wall panel of the present disclosure is not limited to integral forming using blow molding. The double-wall panel of the present disclosure may be produced using other techniques.

Figure 13:
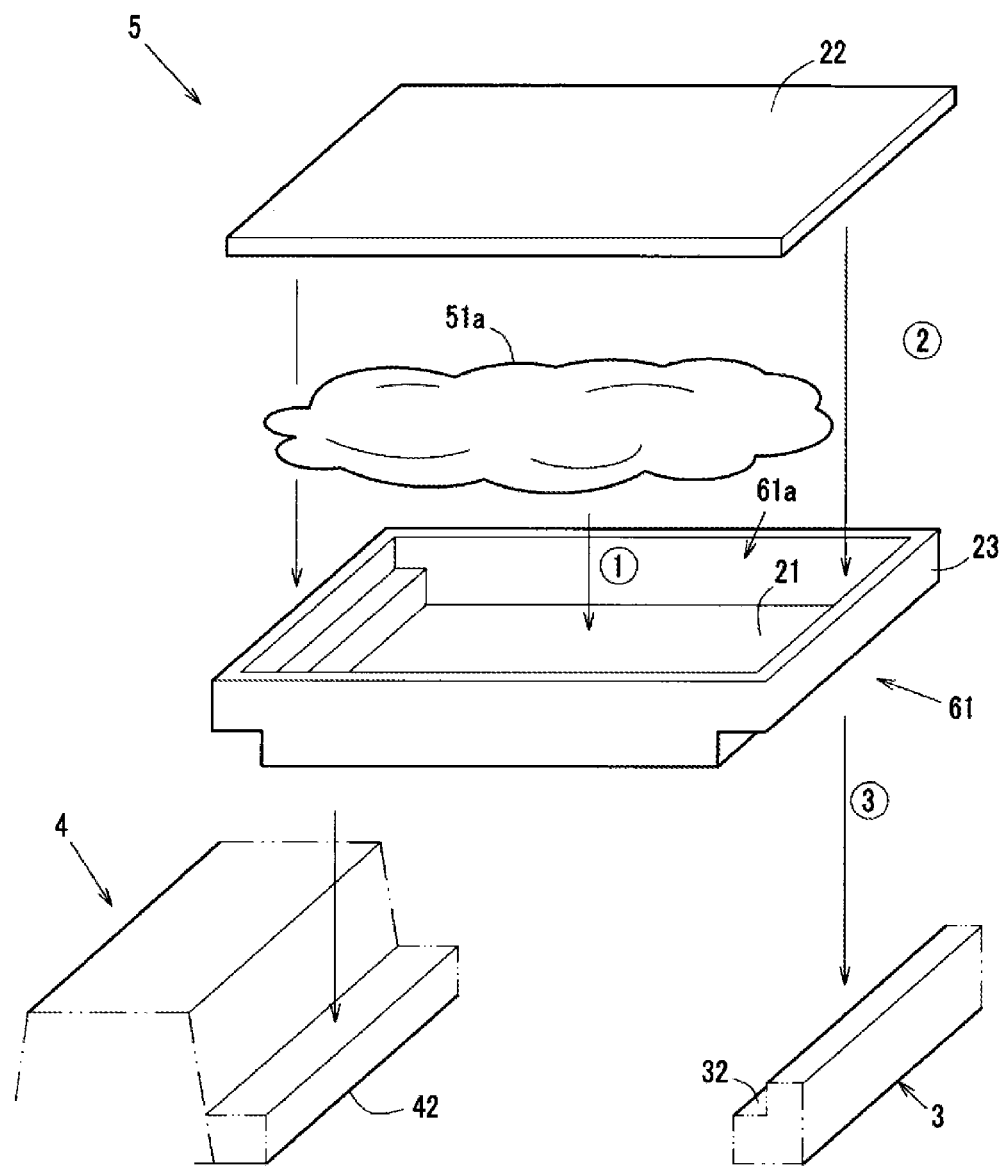
FIG. 13 is a schematic diagram for describing a production method for the double-wall panel of the first embodiment.

For example, as shown in FIG. 13, a box-shaped object 61 including the lower wall 21 and the vertical walls 23 but not the upper wall 22 of the double-wall panel 5 and having an upper opening 61a, is formed, and a fibrous substance (51a) as the core material 51a is inserted into the box-shaped object 61 through the opening 61a (step 1 indicated by an arrow 1 in FIG. 13).

The opening 61a is closed by the upper wall 22 of the double-wall panel 5, and the joint portion between the upper wall 22 and the box-shaped object 61 is welded (step 2 indicated by an arrow 2 in FIG. 13). Note that in the case where the double-wall panel 5 is provided with the honeycomb material 7 (see FIG. 11), step 2 is preferably performed with the honeycomb material 7 previously attached to the back surface of the upper wall 22 (not shown). In this example, the honeycomb material 7 is formed of a steel sheet. Alternatively, in the case where the honeycomb material 7 is formed of hard resin, the honeycomb material 7 may be attached to the back surface of the upper wall 22 by welding.

Finally, the entire double-wall panel 5 including the core layer (fibrous substance (51a)) is joined to a metal framework member of a car body by welding, etc. (step 3 indicated by an arrow 3 of FIG. 13). Note that the side sill 3 as a framework member of a car body may be formed of an extruded aluminum material instead of steel. The outward protrusion 42 is a framework member, to which a tunnel side frame is typically applicable. The outward protrusion 42 may have a configuration similar to that of the side sill 3, or may be formed of aluminum.

Second Embodiment

Next, a second embodiment will be described. The second embodiment, which is related to claims 16-20, is shown in FIGS. 15-28. In the second embodiment, parts are indicated by reference characters in a perspective different from that of the first embodiment.

A panel structure 1 according to the second embodiment is applicable to a car body as with the first embodiment. The panel structure 1 includes a hollow double-wall panel 5 as a double-wall panel. The panel structure 1 is particularly applicable to panel members (e.g., a roof panel, door panel, dashboard panel, floor panel, etc.) that form the interior of a car. In the description that follows, as in the first embodiment, a case where the panel structure 1 is applied to a floor panel included in a floor FL in the interior of a car, will be described.

[(1) Structure of Double-Wall Panel of Second Embodiment]

Figure 15:
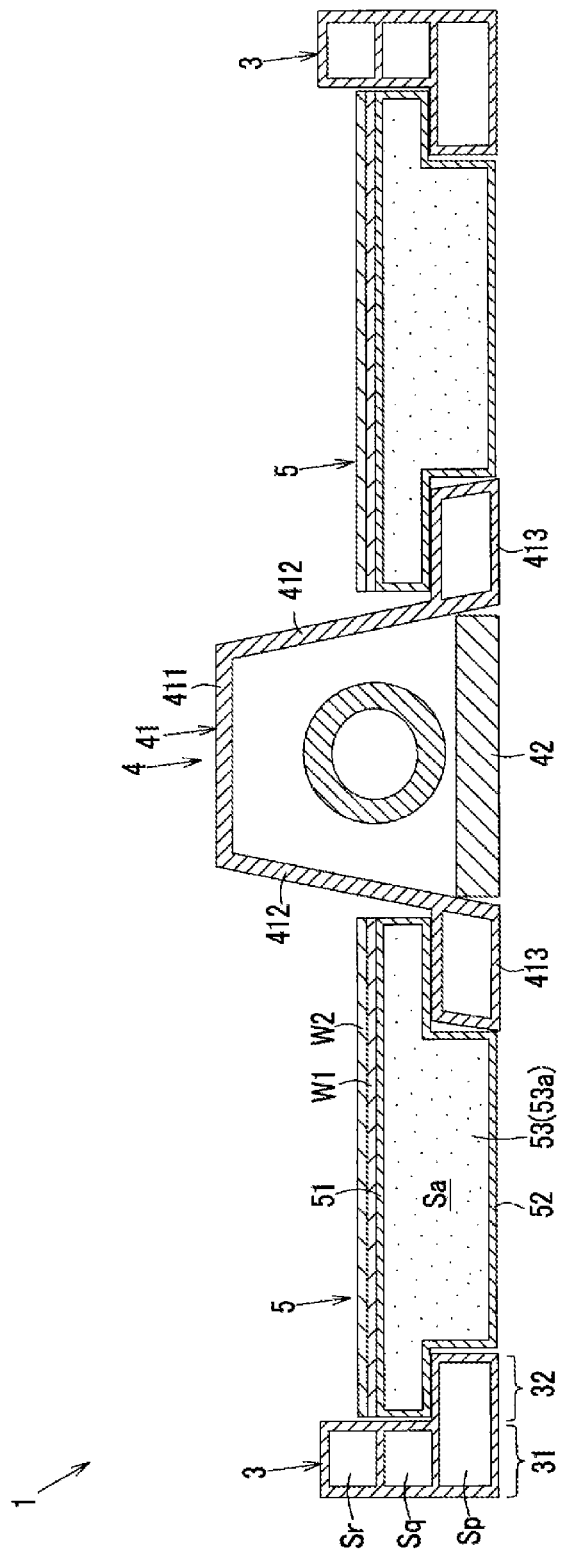
FIG. 15 is a cross-sectional view showing a panel structure according to a second embodiment.

As shown in FIG. 15, the panel structure 1 includes a left and a right side sill (a joint mating member or framework member) 3, a center tunnel (joint mating member) 4, and a left and right hollow double-wall panel 5.

As in the first embodiment, the hollow double-wall panel 5 as a double-wall panel includes a wall 51 as an inner wall, a wall 52 as an outer wall facing the wall 51, and a core material 53a enclosed between the two walls 51 and 52. The core material 53a has at least a predetermined thickness across the panel in all in-plane directions (the car transverse direction and the car longitudinal direction) of the walls 51 and 52.

As in the first embodiment, the core material 53a of the second embodiment has a specific surface area of 20,000 $(mm^2/cm^3)$ or more, where the specific surface area is defined as a surface area per unit volume. See the first embodiment for specific settings.

The left and right the side sills 3, which are formed of, for example, a metal, are framework members that form a left and a right end of the floor FL in the interior of a car, and support outer ends in the car transverse direction of the hollow double-wall panels 5. The left and right side sills 3 are disposed at the left and right ends of the floor FL in the interior of a car, are hollow inside, exend in the car longitudinal direction, and are laterally symmetrical.

The side sill 3 has, for example, substantially an L-shaped cross-section (a cross-section perpendicular to the car longitudinal direction). For example, the side sill 3 has a vertical wall 31 having a rectangular cross-section, and a protruding portion 32 having, for example, a rectangular cross-section that protrudes from a lower portion of the vertical wall 31 inward in the car transverse direction. The protruding portion 32 is joined to the hollow double-wall panel 5. The protruding portion 32 is also hereinafter referred to as the joint portion 32.

The internal space of the side sill 3 is divided into a plurality of (e.g., three) closed spaces Sp, Sq, and Sr by partition walls provided in the side sill 3. The closed spaces Sp, Sq, and Sr are vertically arranged side by side, for example.

The bottom closed space Sp has a rectangular cross-sectional shape (i.e., a cross-sectional shape of a cross-section perpendicular to the car longitudinal direction) that is wide in the car transverse direction, including a lower portion of the vertical wall 31 and the entire protruding portion 32. The top closed space Sr and the middle closed space Sq each have a cross-sectional shape (i.e., a cross-sectional shape of a cross-section perpendicular to the car longitudinal direction) that is one of two upper and lower portions obtained by horizontally dividing an upper portion (i.e., a portion excluding the lower portion of the vertical wall 31) of the vertical wall 31 into two. The rectangular cross-sectional shapes of the closed spaces Sr and Sq have the same transverse width and are narrower than the bottom closed space Sr.

The center tunnel 4 is formed of, for example, a metal. An exhaust pipe (not shown) in which exhaust gas from an engine (not shown) mounted in the engine room of a car flows, or a propeller shaft (not shown) that transmits the power of the engine to the rear wheels of a car, etc., is inserted into the center tunnel 4. The center tunnel 4 supports the inner ends in the car transverse direction of the hollow double-wall panels 5. The center tunnel 4 is disposed at a middle of the floor FL in the interior of a car, extending in the car longitudinal direction. The center tunnel 4 has, for example, a cross-sectional shape (i.e., a cross-sectional shape of a cross-section perpendicular to the car longitudinal direction) that is hollow and substantially trapezoidal, and protrudes upward from the floor FL in the interior of a car.

The center tunnel 4 includes a tunnel body 41 and a tunnel cover 42. The tunnel body 41 extends in the car longitudinal direction. The tunnel body 41 has a cross-sectional shape (i.e., a cross-sectional shape of a cross-section perpendicular to the car longitudinal direction) that is substantially squared-C open downward, i.e., has a top wall 411 and a left and a right side wall 412.

The top wall 411 is formed in the shape of, for example, a flat plate. The left and right side walls 412 are extended downward from left and right ends of the top wall 411. A distance between the left and right side walls 412 gradually becomes wider downward, i.e., slopes outward in the car transverse direction, for example. On one of the opposite main surfaces of each side wall 412 that faces outward in the car transverse direction, a joint portion 413 for joining to the corresponding hollow double-wall panel 5 is provided.

The joint portion 413 protrudes outward in the car transverse direction from a lower portion of the main surface of the side wall 412 facing outward in the car transverse direction, and is extended in the car longitudinal direction. The joint portion 413 has a cross-sectional shape (i.e., a cross-sectional shape of a cross-section perpendicular to the car longitudinal direction) that is, for example, substantially rectangular, and is, for example, hollow inside. The height of the upper surface of the joint portion 413 is the same as the height of the upper surface of the joint portion 32 of the side sill 3 facing that joint portion 413 so that the hollow double-wall panel 5 can be supported horizontally.

The tunnel cover 42, which is used to close the bottom opening of the tunnel body 41, is formed of an elongated flat plate extending in the car longitudinal direction. The tunnel cover 42 is disposed at the bottom opening of the tunnel body 41, and is fixed to the tunnel body 41 using a fastening part (not shown), such as a bolt.

Figure 16:
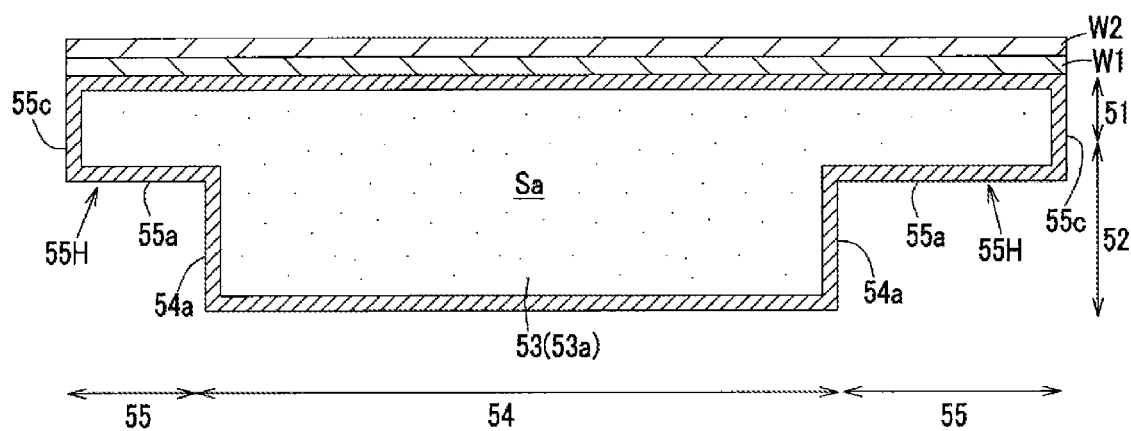
FIG. 16 is a cross-sectional view showing a hollow double-wall panel of FIG. 15.

As shown in FIGS. 15 and 16, in the hollow double-wall panel 5, peripheral portions of the two walls 51 and 52 are joined together, and a core layer 53 is formed in a closed space Sa between the two walls 51 and 52. The walls 51 and 52 are formed of, for example, a resin (e.g., a thermosetting resin, such as polyester resin, or a thermoplastic resin, such as polypropylene). The hollow double-wall panel 5 is formed in the shape of a plate as a whole. The peripheral portions of the two walls 51 and 52 are joined together at, for example, peripheral portions of the hollow double-wall panel 5.

The peripheral portions of the two walls 51 and 52 are joined together by being integrally formed. In order to achieve this, for example, a molten resin as a material for the walls 51 and 52 is sprayed onto a mold for the hollow double-wall panel 5 to integrally form the two walls 51 and 52. This technique is called blow molding.

The core layer 53 is formed by filling the closed space Sa of the hollow double-wall panel 5 with the core material 53a. The core layer 53 has at least one of sound insulating properties and heat insulating properties (in the second embodiment, both of them). The core material 53a is formed of, for example, a fibrous substance or a substance having open-cell structure, in which a solid phase and a gas phase coexist. The gas phase may, for example, be a gas that is highly easily compressible, such as air or $SF_6$ (sulfur hexafluoride) gas, or various other gases, such as xenon gas and krypton gas. Alternatively, the gas phase may be a negative pressure gas or vacuum.

As shown in FIG. 16, the hollow double-wall panel 5, which is formed in the shape of, for example, a flat plate, includes a panel body 54, and edges 55 that are a portion other than the panel body 54. The edges 55 function as joint portions for joining to the joint mating members (e.g., the side sill 3 and the center tunnel 4). The edges 55 are also hereinafter referred to as the joint portions 55. The closed space Sa in the hollow double-wall panel 5 is integrally formed from the inside of the panel body 54 to the inside of the edge 55, and the core layer 53 is integrally formed from the inside of the panel body 54 to the inside of the edge 55. In other words, the insides of the panel body 54 and the edge 55 are filled with the core material 53a.

The panel body 54 is formed in the shape of, for example, a flat plate. The joint portions 55 are horizontal portions 55H in the shape of a flat plate that protrude outward in a horizontal direction with respect to the panel body 54 from the opposite ends in the car transverse direction of the panel body 54. The horizontal portions 55H are provided at a predetermined depth from the lower main surface the panel body 54 in the thickness direction of the panel body 54, so that there is a level difference (step) between the panel body 54 and each horizontal portion 55H.

In the hollow double-wall panel 5 of the second embodiment, the joint portion 55 is provided at only the opposite ends in the car transverse direction of the panel body 54, but not at the opposite ends in the car longitudinal direction of the panel body 54. Alternatively, the joint portion 55 may be provided at the opposite ends in the car longitudinal direction of the panel body 54.

A sound absorption layer W1 and a skin layer W2 are provided in that order on the upper surface (i.e., the upper surface of the upper wall 51) of the hollow double-wall panel 5 with the sound absorption layer W1 closer to the upper surface. The sound absorption layer W1 is formed of a material that absorbs sound (e.g., felt, urethane foam, etc.). The skin layer W2, which is used to protect the surface of the hollow double-wall panel 5 or improve the appearance of the surface of the hollow double-wall panel 5, is formed of, for example, synthetic fibers or rubber.

Figure 17:
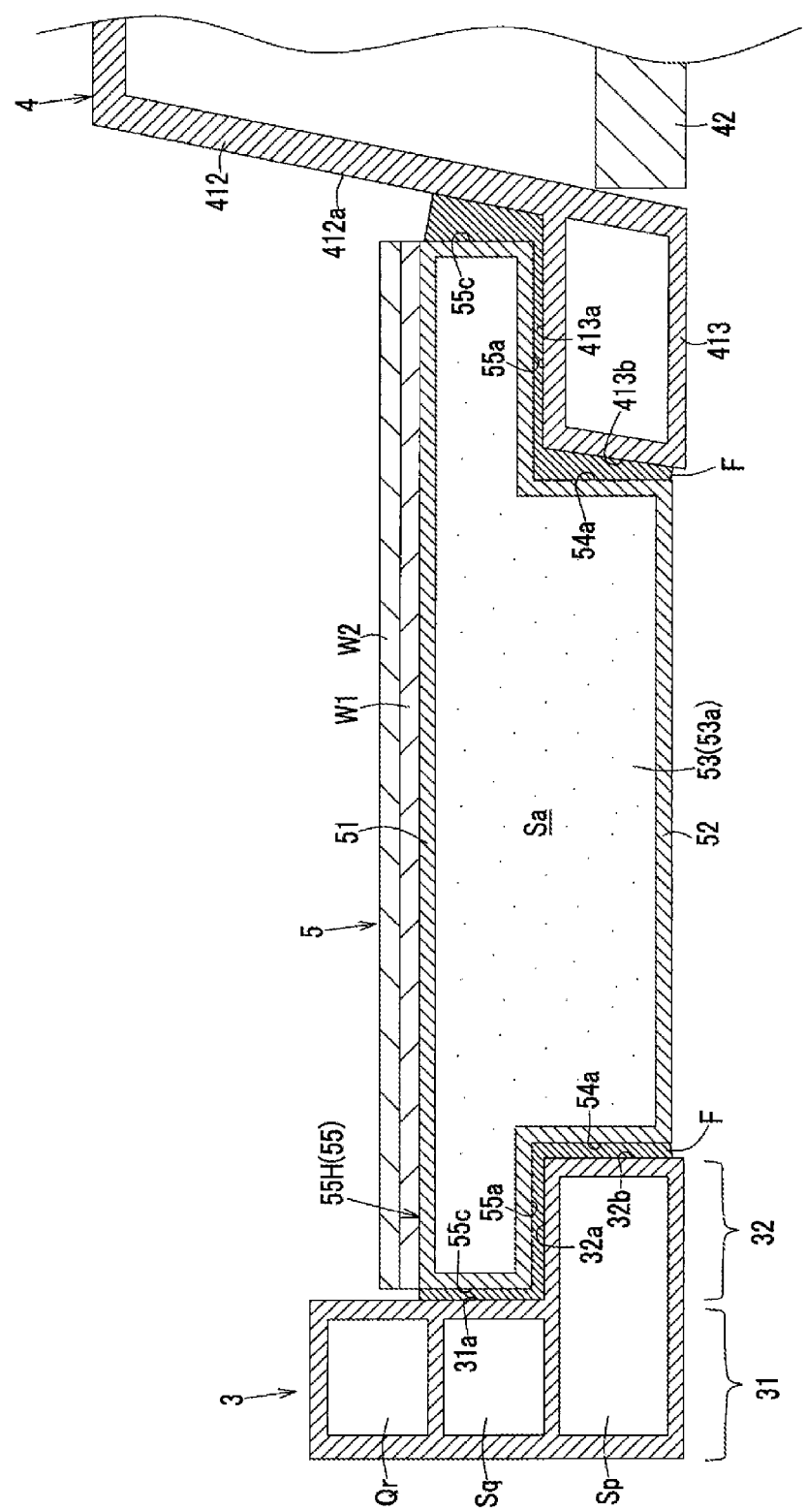
FIG. 17 is an enlarged view of a half portion of the hollow double-wall panel of FIG. 15.

As shown in FIG. 17, the hollow double-wall panel 5 thus configured is joined between the side sill 3 and the center tunnel 4 with the double-wall panel 5 mounted from above. In this joined state, a lower surface (i.e., a lower surface in the thickness direction of the horizontal portion 55H) 55a of the outer joint portion 55 in the car transverse direction of the hollow double-wall panel 5 is put on top of an upper surface (i.e., a joint surface) 32a of the joint portion 32 of the side sill 3, so that the core material 53a in the joint portion 55 covers the upper surface 32a of the side sill 3. In addition, an outer side surface 55c in the car transverse direction of the joint portion 55 adjoins an inner side surface 31a in the car transverse direction of the vertical wall 31 of the side sill 3, and an outer side surface 54a in the car transverse direction of the panel body 54 adjoins an inner side surface 32b in the car transverse direction of the joint portion 32 of the side sill 3.

Similarly, the inner lower surface 55a of the joint portion 55 in the car transverse direction of the hollow double-wall panel 5 is put on top of an upper surface (i.e., a joint surface) 413a of the joint portion 413 of the center tunnel 4, so that the core layer 53 (i.e., the core material 53a) in the joint portion 55 covers the upper surface 413a of the center tunnel 4. In addition, the outer side surface 55c in the car transverse direction of the joint portion 55 adjoins an outer side surface 412a in the car transverse direction of the side wall 412 of the center tunnel 4, and the inner side surface 54a in the car transverse direction of the panel body 54 adjoins the outer side surface 413a in the car transverse direction of the joint portion 413 of the center tunnel 4.

Thus, the core material 53a in the joint portion 55 covers the upper surface (i.e., a joint surface) 32a of the side sill 3 on one side of the hollow double-wall panel 5, and the upper surface (i.e., a joint surface) 413a of the center tunnel 4 on the other side of the hollow double-wall panel 5. As a result, sound insulating properties and heat insulating properties are ensured at the joint portions between the hollow double-wall panel 5, and the side sill 3 and the center tunnel 4.

In the above joined state, an adhesive material F is applied to gaps at the joint portion between the hollow double-wall panel 5 and the side sill 3 (i.e., a gap between the surfaces 31a and 55c, a gap between the surfaces 32a and 55a, and a gap between the surfaces 32b and 54a). An adhesive material F is also applied to gaps at the joint portion between the hollow double-wall panel 5 and the center tunnel 4 (i.e., a gap between the surfaces 412a and 55c, a gap between the surfaces 413a and 55a, and a gap between the surfaces 413b and 54a). The hollow double-wall panel 5 is joined to the side sill 3 and the center tunnel 4 by these adhesive materials F.

Figure 18:
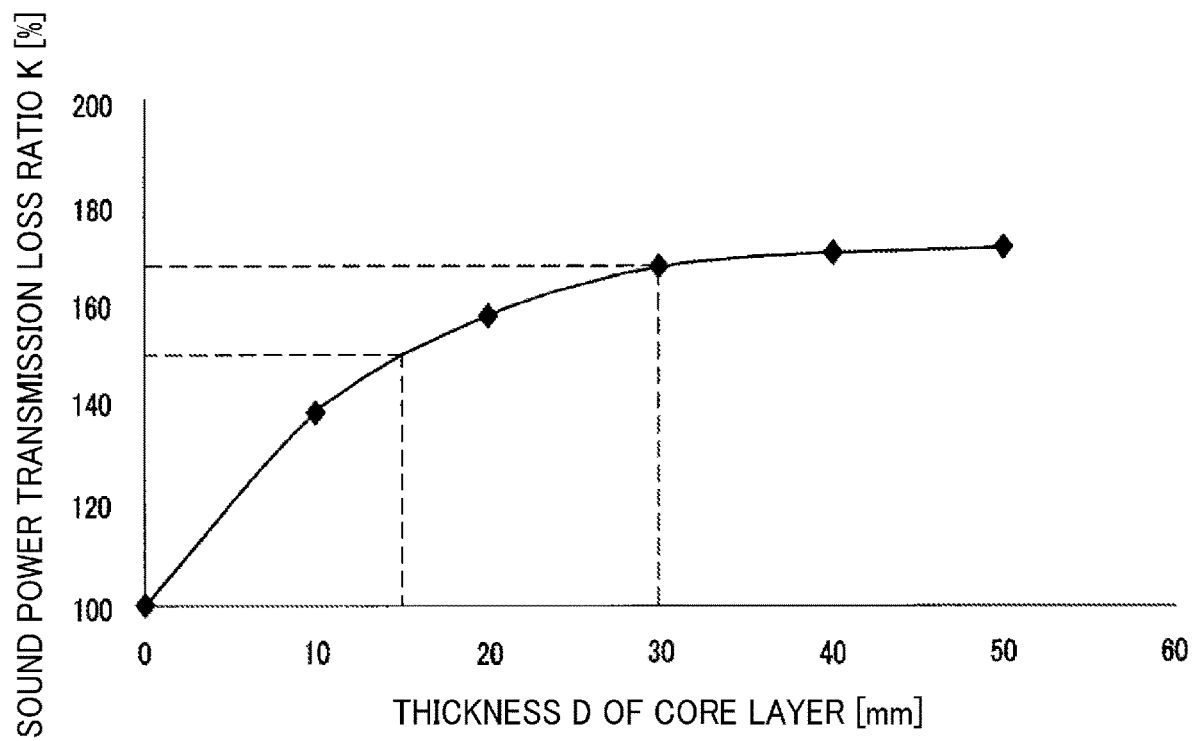
FIG. 18 is a diagram showing a relationship between a thickness D and a sound power transmission loss ratio K of a core layer of a hollow double-wall panel.

FIG. 18 is a diagram showing a relationship between a thickness D (mm) of the core layer 53 and sound insulating performance (e.g., a sound power transmission loss ratio K (%)) of the hollow double-wall panel 5. The sound power transmission loss ratio K refers to the ratio of sound power transmitted through the hollow double-wall panel 5, where the ratio K is 100% in the case where the thickness D of the core layer 53 is 0 mm. As the sound power transmission loss ratio K increases, the sound insulating performance of the hollow double-wall panel 5 increases.

As can be seen from FIG. 18, in the case where the thickness D of the core layer 53 is 30 mm or more, the sound power transmission loss ratio K still increases, but has almost reached a plateau. In the case where the thickness D of the core layer 53 is 15 mm or more, the sound power transmission loss ratio K is reduced by less than 25%, compared to the sound power transmission loss ratio K in the case where the thickness D of the core layer 53 is 30 mm, and therefore, is maintained at a relatively high value. In the case where the thickness D of the core layer 53 is 15 mm or less, the sound power transmission loss ratio K tends to decrease rapidly.

Taking into account the above discussion based on FIG. 18 and the feature that as the core layer 53 becomes thinner, the hollow double-wall panel 5 also becomes thinner, and therefore, a space where the hollow double-wall panel 5 is disposed is more easily ensured, it is preferable that the thickness D of the core layer 53 be 15-30 mm Note that in the case where greater importance is put on the sound insulating properties of the hollow double-wall panel 5, the thickness D of the core layer 53 may be set to as thick as 50 mm. In the case where greater importance is put on the thin thickness of the hollow double-wall panel 5, the thickness D of the core layer 53 may be set to as thin as 15 mm.

Thus, in the panel structure 1 of the second embodiment, the edges 55 of the hollow double-wall panel 5 are joined to the joint surfaces of joint mating members (e.g., the joint surface 32a of the side sill 3 and the joint surface 413a of the center tunnel 4). In addition, in the hollow double-wall panel 5, the peripheral edges of the two walls 51 and 52 are joined together, the closed space Sa between the two walls 51 and 52 is filled with the core material 53a, and the insides of the edges 55 of the hollow double-wall panel 5 are also filled with the core material 53a. When the edge 55 of the hollow double-wall panel 5 is joined to the joint surface of a joint mating member, the core material 53a contained in the edge 55 of the hollow double-wall panel 5 covers the joint surface of the joint mating member.

With the above configuration, the inside of the edge 55 of the hollow double-wall panel 5 is also filled with the core material 53a, and therefore, When the edge 55 of the hollow double-wall panel 5 is joined to the joint surface of a joint mating member, the core material 53a contained in the edge 55 of the hollow double-wall panel 5 covers the joint surface of the joint mating member. Therefore, even if the inside of the joint mating member is not filled with a core material, sound insulating properties and heat insulating properties can be ensured at the joint portion between the edge 55 of the hollow double-wall panel 5 and the joint surface of the joint mating member.

In addition, the joint mating members for the hollow double-wall panel 5 are a framework member (e.g., the side sill 3) and a reinforcement member (e.g., the center tunnel 4) of a car body. Therefore, the hollow double-wall panel 5 can be preferably used as a floor panel in the interior of a car.

In addition, the edges (i.e., joint portions) 55 of the hollow double-wall panel 5 are joined to the joint surfaces 32a and 413a of the side sill 3 and the center tunnel 4 (joint mating members) by adhesion. Therefore, it is not necessary to provide a joint hole in the hollow double-wall panel 5. Therefore, the hollow double-wall panel 5 can be joined to the joint mating members while the hermeticity of the closed space Sa in the hollow double-wall panel 5 is ensured.

In addition, the thickness of the core layer 53 formed by filling the closed space Sa of the hollow double-wall panel 5 with the core material 53a is in the range of 7-50 mm Therefore, both sound insulating properties and thin thickness of the hollow double-wall panel 5 can be simultaneously achieved. In particular, in the case where the thickness of the core layer 53 of the hollow double-wall panel 5 is 7 mm, at least the minimum sound insulating properties of the hollow double-wall panel 5 required in practical use can be ensured, while the thickness of the hollow double-wall panel 5 can be substantially minimized Meanwhile, in the case where the thickness of the core layer 53 of the hollow double-wall panel 5 is 50 mm, the sound insulating properties of the hollow double-wall panel 5 can be substantially maximized, while the thickness of the hollow double-wall panel 5 is set to the maximum of the practical thickness range.

In addition, the two walls 51 and 52 are formed of, for example, a thermosetting resin or thermoplastic resin. Therefore, the heat resistance of the hollow double-wall panel 5 can be improved compared to general-purpose resins, and the weight of the hollow double-wall panel 5 can be reduced, while a sufficient strength of the hollow double-wall panel 5 is ensured.

Note that the two walls 51 and 52 may be formed of aluminum, magnesium, or iron instead of a thermosetting resin or thermoplastic resin. Even in this case, a sufficient strength of the hollow double-wall panel 5 can be ensured.

In the case where the two walls 51 and 52 may be formed of aluminum or magnesium, the weight of the hollow double-wall panel 5 can be reduced. In the case where the two walls 51 and 52 may be formed of aluminum or iron, a sufficient heat resistance of hollow double-wall panel 5 can be ensured.

Note that the two walls 51 and 52 may be formed of at least one of a thermosetting resin, a thermoplastic resin, aluminum, magnesium, and iron. Alternatively, the two walls 51 and 52 may be formed of the same or different one of the above materials.

In addition, the peripheral edges of the two walls 51 and 52 are joined together by being integrally formed. Therefore, the hermeticity of the two walls 51 and 52 can be increased at the peripheral edges thereof.

In addition, the hollow double-wall panel 5 has the edges (i.e., joint portions) 55 and the panel body 54 excluding the edges 55. The edge 55 has the horizontal portion 55H that protrudes outward in the horizontal direction with respect to the panel body 54. The surface 55a in the thickness direction of the horizontal portion 55H is joined to the joint surface of a joint mating member (e.g., the joint surface 32a of the side sill 3 or the joint surface 413a of the center tunnel 4). Therefore, even if a load is applied to the joint surface in the vertical direction (i.e., the thickness direction of the horizontal portion 55H) with respect to the hollow double-wall panel 5, the horizontal portion 55H is hooked by the joint surface of the joint mating member, and therefore, the hollow double-wall panel 5 can be substantially prevented from being disjoined from the joint mating member.

Note that in the second embodiment, the horizontal portion 55H is thinner than the panel body 54, and is disposed at a predetermined depth from the lower surface of the panel body 54 in the thickness direction of the panel body 54, so that there is a level difference (step) between the horizontal portion 55H and the panel body 54. Alternatively, the horizontal portion 55H may have the same thickness as that of the panel body 54 so that the upper and lower surfaces of the horizontal portion 55H are flush with the upper and lower surfaces, respectively, of the panel body 54, i.e., there is not a level difference (step) therebetween.

[(2) Variation 1 of Second Embodiment]

Figure 19A:
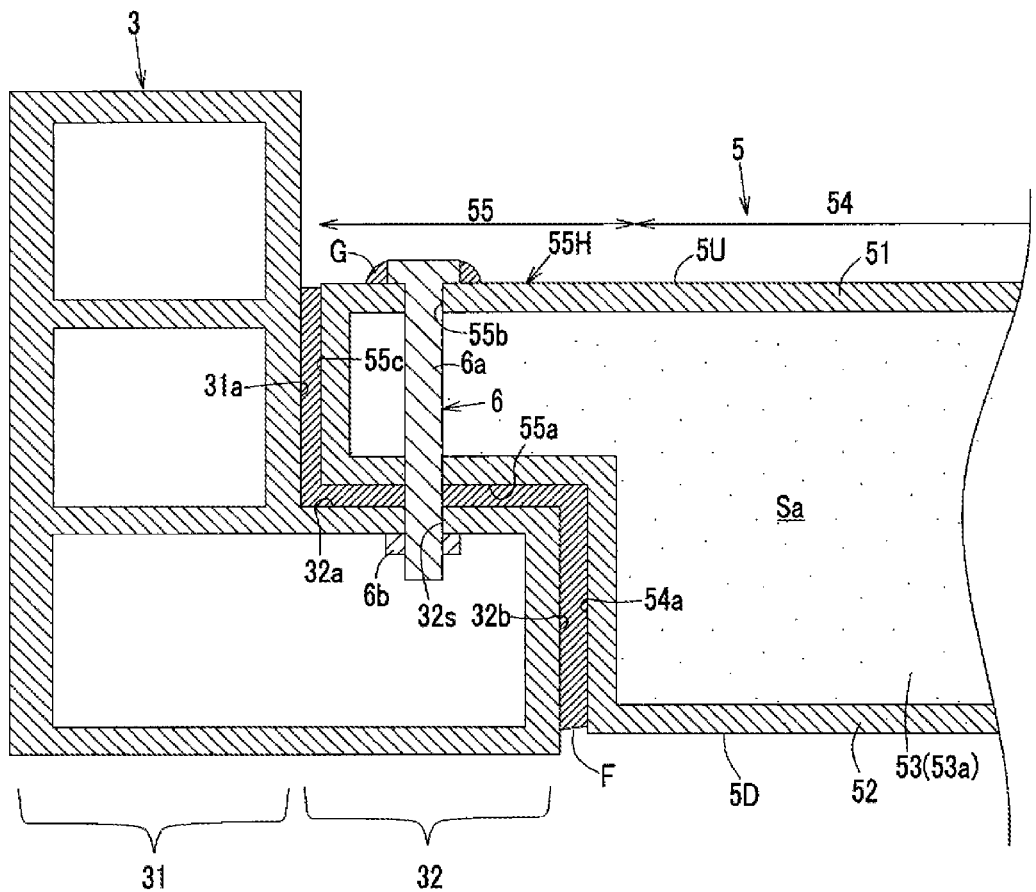
FIG. 19A is a cross-sectional view in the case where a horizontal portion is joined to a joint mating member using fastening parts.

As shown in FIG. 19A, in Variation 1 of the second embodiment, the hollow double-wall panel 5 and a joint mating member are mechanically joined together using fastening parts 6 (a bolt 6a and a nut 6b).

More specifically, in Variation 1, a through-hole 55b is provided in the horizontal portion 55H of the edge 55 of the hollow double-wall panel 5. The through-hole 55b penetrates through the horizontal portion 55H in the thickness direction of the horizontal portion 55H. A through-hole 32s is provided in the joint surface 32a (i.e., an upper wall of the joint portion 32) of the side sill 3. The nut 6b is fixed to a back surface of the joint surface 32a of the side sill 3 (i.e., a back surface of the upper wall of the joint portion 32). The threaded hole of the nut 6b is aligned with the through-hole 32s.

The bolt 6a is inserted into the through-hole 55b of the horizontal portion 55H of the hollow double-wall panel 5 and the through-hole 32s of the joint surface 32a of the side sill 3 successively, and is then screwed into the nut 6b. This fastening allows the hollow double-wall panel 5 and the joint mating member (e.g., the side sill 3) to be mechanically joined together by the fastening parts 6.

Figure 19B:
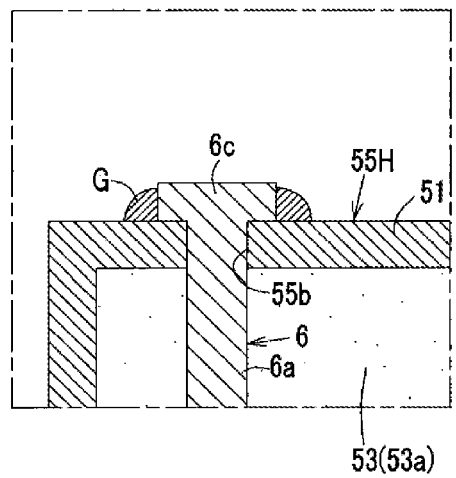
FIG. 19B is an enlarged view of a portion of FIG. 19A.
Figure 19C:
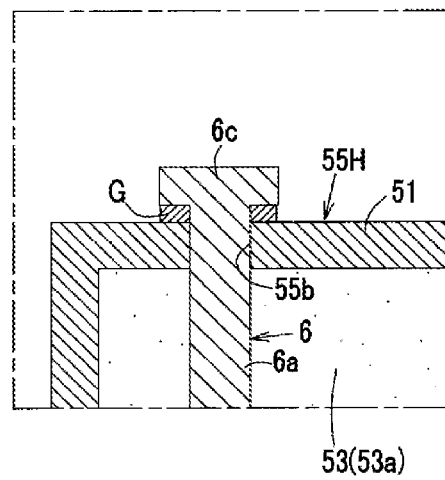
FIG. 19C is a cross-sectional view showing a variation of FIG. 19B.

As shown in FIG. 19B, a sealing material G is provided around the head 6c of the bolt 6a to seal a gap between the head 6c of the bolt 6a and an upper surface (i.e., an upper surface of the edge 55) of the horizontal portion 55H. The sealing material G ensures sufficient hermeticity of the closed space Sa in the hollow double-wall panel 5. Note that as shown in FIG. 19C, instead of providing the sealing material G around the head 6c of the bolt 6a, the sealing material G may be provided between a back surface of the head 6c of the bolt 6a and a peripheral portion of the through-hole 55b at the upper surface of the horizontal portion 55H.

As shown in FIG. 19A, as in the second embodiment, an adhesive material F is applied to a joint portion between the hollow double-wall panel 5 and a joint mating member (e.g., the side sill 3). The adhesive material F also joins the hollow double-wall panel 5 to the joint mating member. As a result, the adhesive material F seals the gap between the through-hole 55b and the bolt 6a on the lower surface (i.e., a joint surface) 55a of the edge 55 of the hollow double-wall panel 5. This also ensures sufficient hermeticity of the closed space Sa in the hollow double-wall panel 5.

Thus, in Variation 1, the edge 55 of the hollow double-wall panel 5 is joined to the joint surface of a joint mating member (e.g., the joint surface 32a of the side sill 3) by the fastening parts 6. Therefore, the hollow double-wall panel 5 and the joint mating member can be mechanically joined together (i.e., with a sufficient joining strength).

In addition, the horizontal portion 55H of the edge 55 of the hollow double-wall panel 5 is fastened to the joint surface of a joint mating member using the fastening parts 6. Therefore, by the horizontal portion 55H being joined to the joint mating member, the edge 55 of the hollow double-wall panel 5 can be mechanically joined to the joint surface of the joint mating member.

In addition, the gap between the edge 55 of the hollow double-wall panel 5 (e.g., the upper surface of the edge 55) and a fastening part 6 (e.g., the head 6c of the bolt 6a) is sealed by the sealing material G. Therefore, even in the case where the through-hole 55b into which the fastening part 6 is inserted is provided in the edge 55 of the hollow double-wall panel 5, the hermeticity of the closed space Sa in the hollow double-wall panel 5 can be ensured.

Although, in Variation 1, the joining of the hollow double-wall panel 5 to the side sill 3 has been described as an example, the hollow double-wall panel 5 may be similarly joined to the center tunnel 4 using the fastening parts 6.

Note that in the second embodiment, the adhesive material F may not be provided in the gap at the joint portion between the hollow double-wall panel 5 and the side sill 3.

[(3) Variation 2 of Second Embodiment]

Figure 20:
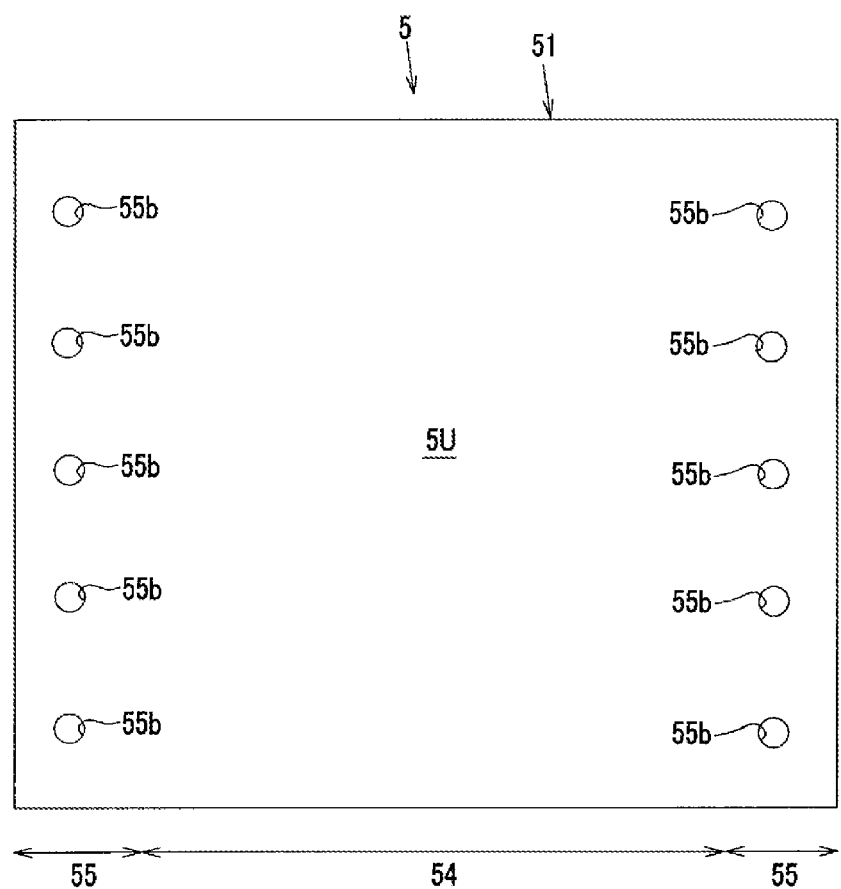
FIG. 20 is a plan view of a hollow double-wall panel as viewed from above.

Variation 2 is a modification of Variation 1 in which the through-hole 55b of the edge 55 of the hollow double-wall panel 5 has the following relationship with the surface area of the hollow double-wall panel 5. Specifically, as shown in FIG. 20, an aperture ratio Y is defined as the proportion of the opening area S2 of a first one of the openings of the through-hole 55b to the area S1 of a first one (e.g., the upper main surface) 5U of the main surfaces of the hollow double-wall panel 5 (i.e., the first opening of the through-hole 55b and the first surface 5U are on the same side), i.e., Y=(S2× 100)/S1). The aperture ratio Y is set to less than 1%.

Note that in the case where a plurality of through-holes 55b are provided in the edge 55 of the hollow double-wall panel 5, the opening area S2 is defined as the sum of the opening areas of the openings on one side of all the through-holes 55b.

Note that the opening of the through-hole 55b is formed in both the front main surface (i.e., the upper main surface 5U) and back main surface (i.e., the lower main surface 5D)

of the hollow double-wall panel 5. Therefore, the above aperture ratio Y may be defined as Y=(S3×100)/S4, where S4 represents the area of all surfaces of the hollow double-wall panel 5 (i.e., the sum of the areas of the upper main surface 5U and the lower main surface 5D), and S3 represents the sum of the opening areas of the opposite openings of the through-hole 55b provided in the hollow double-wall panel 5. Also in this case, if a plurality of through-holes 55b are provided, the opening area S5 is defined as the sum of the opening areas of the opposite ends of all the through-holes 55b.

Figure 21:
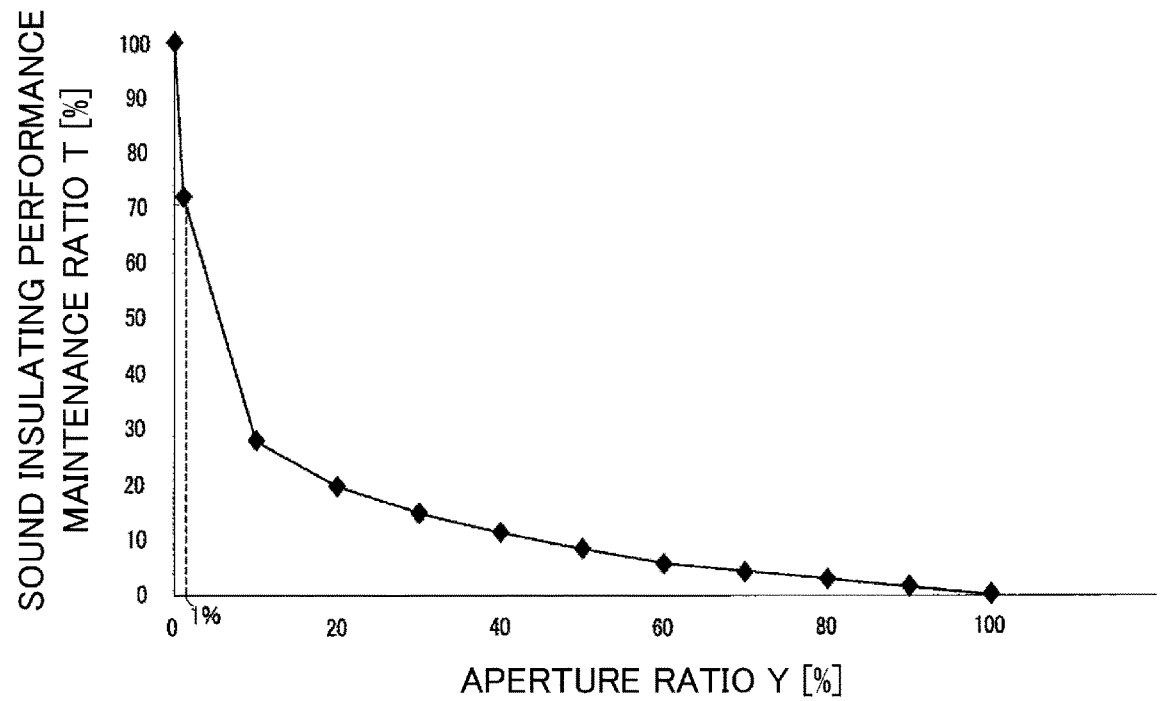
FIG. 21 is a diagram showing a relationship between a sound insulation performance maintenance ratio T and an aperture ratio Y of a hollow double-wall panel.

FIG. 21 is a diagram showing a relationship between a sound insulation performance maintenance ratio T (%) of the hollow double-wall panel 5 and the aperture ratio Y (%). The sound insulation performance maintenance ratio T refers to at what level the sound insulation performance of the hollow double-wall panel 5 is maintained. The sound insulation performance maintenance ratio T is 100% in the case where the aperture ratio Y is 0% (i.e., the through-hole 55b is absent in the hollow double-wall panel 5), and 0% in the case where the aperture ratio Y is 100%. As can be seen from FIG. 21, in the case where the aperture ratio Y is in the range of 0-1%, the sound insulation performance maintenance ratio T decreases by about 30%. Therefore, as described above, the aperture ratio Y is preferably set to less than 1% in order to maintain the sound insulation performance maintenance ratio T at a high value.

Thus, in Variation 2, the aperture ratio Y of the through-hole 55b provided in the hollow double-wall panel 5 is less than 1%. Therefore, about 70% or more (i.e., sufficient sound insulating properties in practical use) of the sound insulating properties that are achieved when the hollow double-wall panel 5 is perfectly hermetically sealed (i.e., the through-hole 55b is absent) can be ensured.

[(4) Variation 3 of Second Embodiment]

Figure 22:
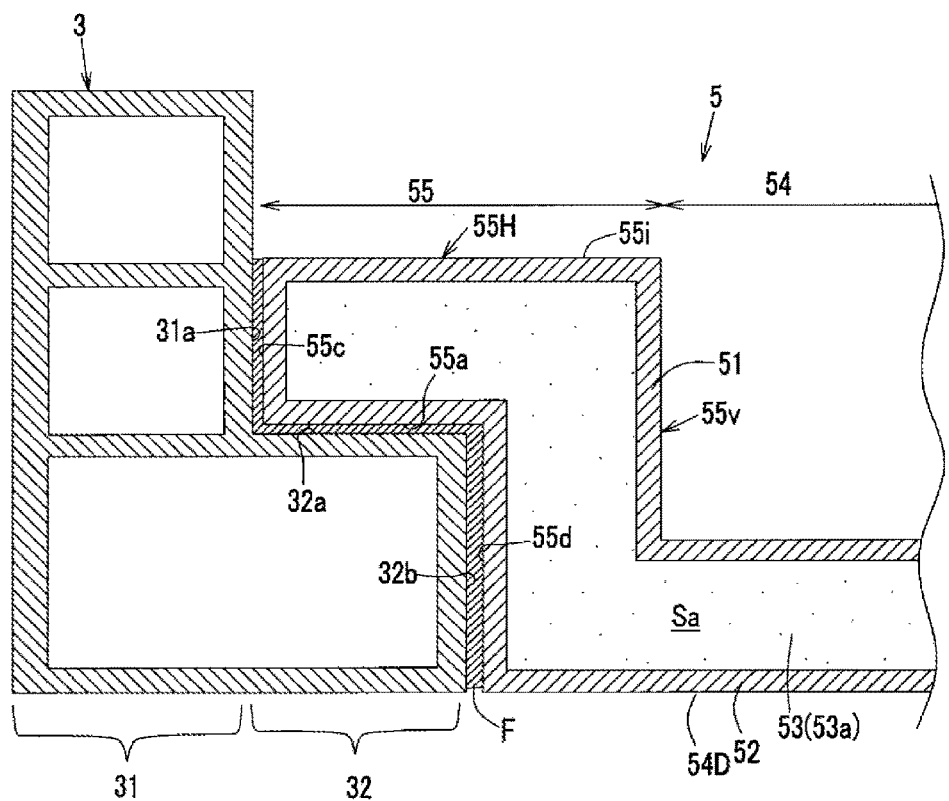
FIG. 22 is a cross-sectional view in the case where a joint portion of a hollow double-wall panel has a vertical portion and a horizontal portion.

In the second embodiment, the joint portion (i.e., an edge) 55 of the hollow double-wall panel 5 includes only the horizontal portion 55H. As shown in FIG. 22, in Variation 3, the joint portion (i.e., an edge) 55 of the hollow double-wall panel 5 includes a horizontal portion 55H and a vertical portion 55V. The vertical portion 55V is in the shape of a plate that protrudes upward in the vertical direction with respect to the panel body 54, from an end in the car transverse direction of the panel body 54 of the hollow double-wall panel 5. The horizontal portion 55H is in the shape of a plate that protrudes from an upper end of the vertical portion 55V, outward in the horizontal direction with respect to the panel body 54.

In Variation 3, the horizontal portion 55H is disposed at a predetermined depth from the lower surface 54D of the panel body 54 upward in the thickness direction of the panel body 54, i.e., there is a level difference (step) between the horizontal portion 55H and the lower surface 54D of the panel body 54. In addition, the panel body 54 is disposed at a predetermined depth from an upper surface 55i of the horizontal portion 55H downward in the thickness direction of the horizontal portion 55H, i.e., there is a level difference (step) between the panel body 54 and the upper surface 55i of the horizontal portion 55H. Thus, the thickness of the panel body 54 is, for example, smaller than the thickness of the panel body 54 of the second embodiment.

As shown in FIG. 22, in Variation 3, when the hollow double-wall panel 5 is joined to a joint mating member (e.g., the side sill 3), a lower surface 55a of the horizontal portion 55H (i.e., a lower surface in the thickness direction of the horizontal portion 55H) of the hollow double-wall panel 5 is put on top of the upper surface (i.e., a joint surface) 32a of the joint portion 32 of the side sill 3, so that the core material 53a in the horizontal portion 55H covers the upper surface 32a of the side sill 3. In addition, an outer side surface 55d in the car transverse direction of the vertical portion 55V (i.e., an outer surface in the thickness direction of the vertical portion 55V) of the hollow double-wall panel 5 is put on top of the inner side surface (i.e., a joint surface) 32b in the car transverse direction of the joint portion 32 of the side sill 3, so that the core material 53a in the vertical portion 55V covers the side surface 32b of the side sill 3. In addition, the outer side surface 55c in the car transverse direction of the horizontal portion 55H of the hollow double-wall panel 5 adjoins the inner side surface 31a in the car transverse direction of the vertical wall 31 of the side sill 3.

Thus, the core material 53a in the joint portion 55 of the hollow double-wall panel 5 covers the joint surfaces 32a and 32b of the side sill 3, and therefore, sound insulating properties and heat insulating properties can be ensured at the joint portion between the hollow double-wall panel 5 and the side sill 3.

In addition, in the above joined state, an adhesive material F is applied to gaps at the joint portion between the hollow double-wall panel 5 and the side sill 3 (i.e., a gap between the surfaces 31a and 55c, a gap between the surfaces 32a and 55a, and a gap between the surfaces 32b and 55d). The hollow double-wall panel 5 is joined to the side sill 3 by the adhesive material F.

Although the outer joint portion (i.e., a joint portion to the side sill 3) 55 in the car transverse direction of the hollow double-wall panel 5 has been described above, an inner joint portion (i.e., a joint portion joined to the center tunnel 4) 55 in the car transverse direction of the hollow double-wall panel 5 is similarly formed, and is similarly joined to the center tunnel 4.

Thus, in Variation 3, the joint portion (i.e., an edge) 55 of the hollow double-wall panel 5 has the vertical portion 55V protruding vertically with respect to the panel body 54, and the outer side surface 55d in the thickness direction of the vertical portion 55V is joined to the joint surface of a joint mating member (e.g., the joint surface 32b of the side sill 3). Therefore, even when a load is applied to the joint surface in the horizontal direction (i.e., the thickness direction of the vertical portion 55V) with respect to the hollow double-wall panel 5, the vertical portion 55V is hooked by the joint surface of the joint mating member, and therefore, the hollow double-wall panel 5 is substantially prevented from being disjoined from the joint mating member.

In Variation 3, it is assumed that the joint portion (i.e., an edge) 55 of the hollow double-wall panel 5 includes the vertical portion 55V and the horizontal portion 55H. Alternatively, the joint portion (i.e., an edge) 55 of the hollow double-wall panel 5 may include only the vertical portion 55V.

[(5) Variation 4 of Second Embodiment]

Figure 23:
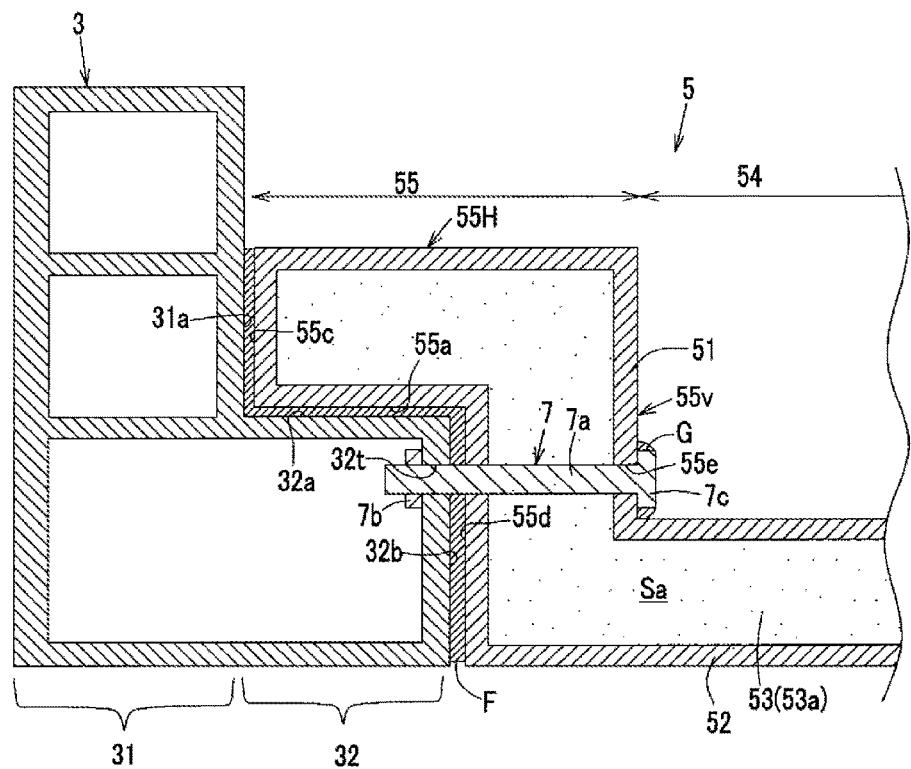
FIG. 23 is a cross-sectional view in the case where a vertical portion of a hollow double-wall panel is joined to a joint mating member using fastening parts.

As shown in FIG. 23, Variation 4 is a modification of Variation 3 in which the hollow double-wall panel 5 and the side sill 3 (joint mating member) are mechanically joined together using fastening parts 7 (a bolt 7a and a nut 7b).

More specifically, in Variation 4, a through-hole 55e is provided in the vertical portion 55V of the joint portion (i.e., an edge) 55 of the hollow double-wall panel 5. The through-hole 55e penetrates through the vertical portion 55V in the thickness direction of the vertical portion 55V. A through-hole 32t is provided in the side surface (i.e., a joint surface) 32b of the joint portion 32 of the side sill 3. The nut 7b is fixed to a back surface (i.e., a back surface of the side wall of the joint portion 32) facing the joint surface 32b of the side sill 3. The threaded hole of the nut 7b is aligned with the through-hole 32t.

The bolt 7a is inserted into the through-hole 55e of the vertical portion 55V of the hollow double-wall panel 5 and the through-hole 32t of the side surface 32b of the side sill 3 successively, and is then screwed into the nut 7b. This fastening allows the hollow double-wall panel 5 and a joint mating member (e.g., the side sill 3) to be mechanically joined together by the fastening parts 7.

A sealing material G is provided around the head 7c of the bolt 7a (i.e., a fastening part 7) to seal a gap between the head 7c of the bolt 7a and the vertical portion 55V (i.e., the edge 55). The sealing material G ensures sufficient hermeticity of the closed space Sa in the hollow double-wall panel 5.

Note that, as in Variation 3, an adhesive material F is applied to a joint portion between the hollow double-wall panel 5 and a joint mating member (e.g., the side sill 3). The adhesive material F also joins the hollow double-wall panel 5 to the joint mating member. As a result, the adhesive material F seals a gap between the through-hole 55e and the bolt 7a at the side surface (i.e., a joint surface) 55d of the vertical portion 55V of the hollow double-wall panel 5. This also ensures sufficient hermeticity of the closed space Sa in the hollow double-wall panel 5.

Thus, in Variation 4, the vertical portion 55V of the joint portion (i.e., an edge) 55 of the hollow double-wall panel 5 is fastened to the joint surface of a joint mating member (e.g., the side surface 32b of the side sill 3) by the fastening parts 7. Therefore, the joint portion 55 of the hollow double-wall panel 5 can be mechanically fixed to the joint mating member using the vertical portion 55V joined to the joint mating member.

In addition, the ends of the fastening parts 7 are prevented from protruding in the thickness direction of the panel body 54. As a result, the fastening parts 7 can be substantially prevented from being stuck by an external object, and can be less noticeable from the outside.

[(6) Variation 5 of Second Embodiment]

Figure 24:
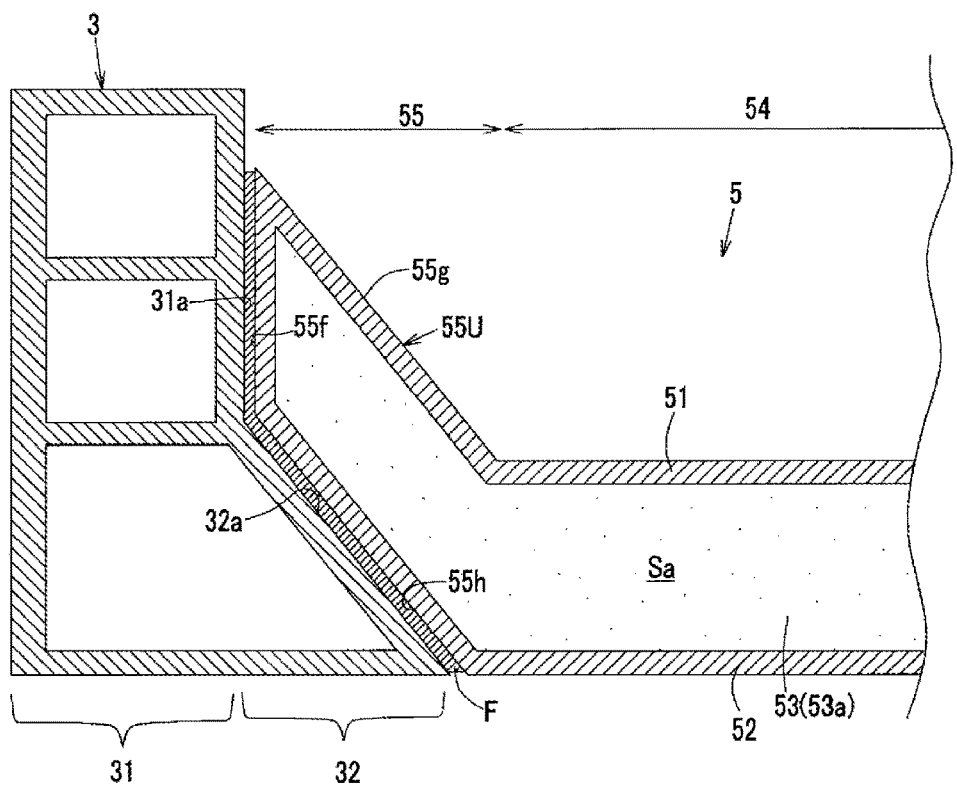
FIG. 24 is a cross-sectional view in the case where a joint portion of a hollow double-wall panel has a sloping portion.

In the second embodiment, the joint portion (i.e., an edge) 55 of the hollow double-wall panel 5 includes the horizontal portion 55H. Alternatively, as shown in FIG. 24, in Variation 5, the joint portion 55 of the hollow double-wall panel 5 includes a sloping portion 55U. The sloping portion 55U protrudes from an end in the car transverse direction of the panel body 54 of the hollow double-wall panel 5, outward in the car transverse direction with respect to the panel body 54, and is in the shape of a plate protruding upward in the vertical direction. An outer side surface 55f in the car transverse direction of the sloping portion 55U is perpendicular to the panel body 54.

In Variation 5, the joint portion 32 of the side sill 3 protrudes from a lower portion of the vertical wall 31 inward in the car transverse direction, and the upper surface 32a of joint portion 32 slopes in parallel to the extending direction of the sloping portion 55U. In other words, the upper surface 32a slopes down inward the car transverse direction.

As shown in FIG. 24, in Variation 5, when the hollow double-wall panel 5 is joined to a joint mating member (e.g., the side sill 3), a lower surface (i.e., a lower surface in the thickness direction of the sloping portion 55U, i.e., a joint surface to a joint mating member) 55h of the sloping portion 55U of the hollow double-wall panel 5 is put on top of the upper surface (i.e., a joint surface) 32a of the joint portion 32 of the side sill 3, so that the core material 53a in the sloping portion 55U covers the upper surface 32a of the side sill 3. In addition, the side surface 55f of the sloping portion 55U of the hollow double-wall panel 5 adjoins the inner side surface 31a in the car transverse direction of the vertical wall 31 of the side sill 3.

Thus, the core material 53a in the joint portion 55 of the hollow double-wall panel 5 covers the joint surface 32a of the side sill 3, and therefore, sound insulating properties and heat insulating properties are ensured at the joint portion between the hollow double-wall panel 5 and the side sill 3.

In addition, in the above joined state, an adhesive material F is applied to gaps at the joint portion between the hollow double-wall panel 5 and the side sill 3 (i.e., a gap between the surfaces 31a and 55f, and a gap between the surfaces 32a and 55h). The hollow double-wall panel 5 is joined to the side sill 3 by the adhesive material F.

Although the outer joint portion (i.e., a joint portion to the side sill 3) 55 in the car transverse direction of the hollow double-wall panel 5 has been described above, an inner joint portion (i.e., a joint portion joined to the center tunnel 4) 55 in the car transverse direction of the hollow double-wall panel 5 is similarly formed, and is similarly joined to the center tunnel 4.

Thus, in Variation 5, the joint portion (i.e., an edge) 55 of the hollow double-wall panel 5 has the sloping portion 55U sloping in one direction (e.g., upward) in the thickness direction of the panel body 54, and the lower surface (i.e., a joint surface) 55h in the thickness direction of the sloping portion 55U is joined to the joint surface of a joint mating member (e.g., the joint surface 32a of the side sill 3). Therefore, a load can be applied uniformly to the entire lower surface (i.e., a joint surface to a joint mating member) in the thickness direction of the sloping portion 55U. As a result, the concentration of a load to a portion of a joint surface (e.g., a base end of the edge 55 of the hollow double-wall panel 5) to a joint mating member of the sloping portion 55U can be reduced.

In addition, the lower surface 55h in the thickness direction of the sloping portion 55U is joined to the joint surface of a joint mating member (e.g., the joint surface 32a of the side sill 3). Therefore, even when a pressing load is applied to the hollow double-wall panel 5 from above in the vertical direction of the panel body 54, the sloping portion 55U is hooked by the joint surface of the joint mating member, and therefore, the hollow double-wall panel 5 is substantially prevented from being disjoined from the joint mating member.

[(7) Variation 6 of Second Embodiment]

Figure 25:
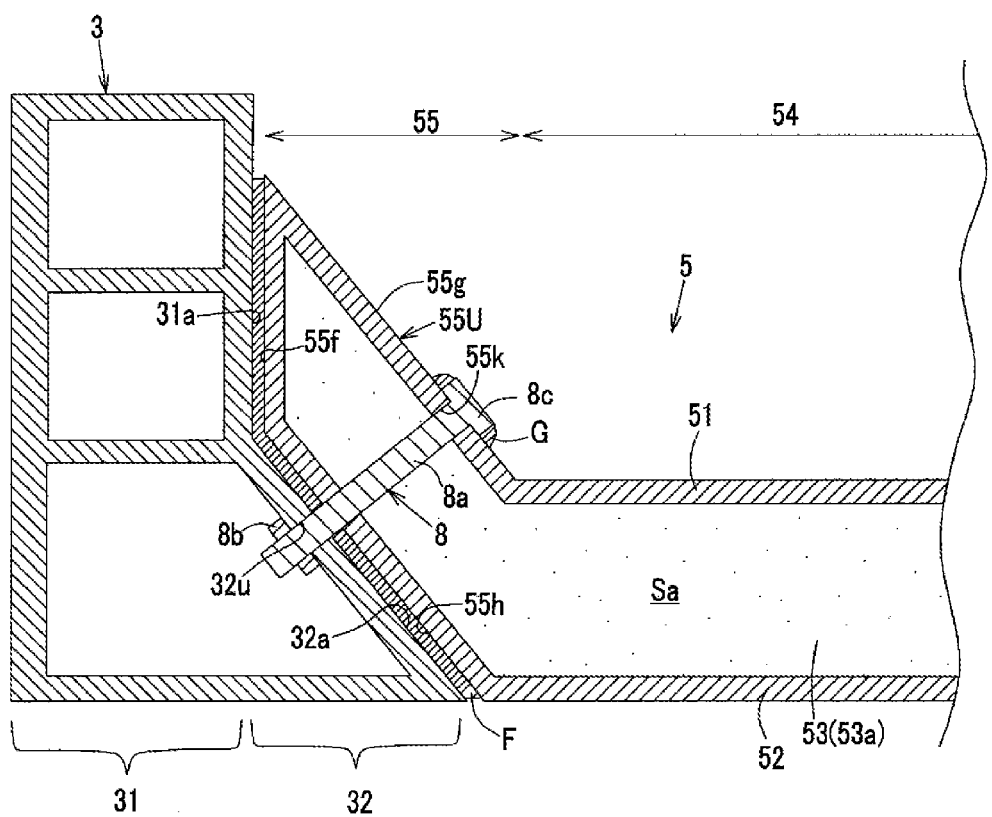
FIG. 25 is a cross-sectional view in the case where a sloping portion of a hollow double-wall panel is joined to a joint mating member using fastening parts.

As shown in FIG. 25, Variation 6 is a modification of Variation 5 in which the hollow double-wall panel 5 and the side sill 3 (joint mating member) are mechanically joined together using fastening parts 8 (a bolt 8a and a nut 8b).

More specifically, in Variation 6, a through-hole 55k is provided in the sloping portion 55U of the hollow double-wall panel 5. The through-hole 55k penetrates through the sloping portion 55U in the thickness direction of the sloping portion 55U. A through-hole 32u is provided in the upper surface (i.e., a joint surface) 32a of the joint portion 32 of the side sill 3. The nut 8b is fixed to a back surface (i.e., a back surface of the upper wall of the joint portion 32) facing the joint surface 32a of the side sill 3. The threaded hole of the nut 8b is aligned with the through-hole 32u.

The bolt 8a is inserted into the through-hole 55k of the sloping portion 55U of the hollow double-wall panel 5 and the through-hole 32u of the upper surface 32a of the side sill 3 successively, and is then screwed into the nut 8b. This fastening allows the hollow double-wall panel 5 and a joint mating member (e.g., the side sill 3) to be mechanically joined together by the fastening parts 8.

A sealing material G is provided around the head 8c of the bolt 8a (i.e., a fastening part 8) to seal a gap between the head 8c of the bolt 8a and the sloping portion 55U (i.e., the edge 55). The sealing material G ensures sufficient hermeticity of the closed space Sa in the hollow double-wall panel 5.

Note that, as in Variation 5, an adhesive material F is applied to a joint portion between the hollow double-wall panel 5 and a joint mating member (e.g., the side sill 3). The adhesive material F also joins the hollow double-wall panel 5 to the joint mating member. As a result, the adhesive material F seals a gap between the through-hole 55k and the bolt 8a at a lower surface (i.e., a joint surface) 55h of the sloping portion 55U of the hollow double-wall panel 5. This also ensures sufficient hermeticity of the closed space Sa in the hollow double-wall panel 5.

Thus, in Variation 6, the sloping portion 55U of the joint portion (i.e., an edge) 55 of the hollow double-wall panel 5 is fastened to the joint surface of a joint mating member (e.g., the side surface 32b of the side sill 3) by the fastening parts 8. Therefore, the hollow double-wall panel 5 can be mechanically fixed to the joint mating member using the sloping portion 55U joined to the joint mating member.

In addition, the ends of the fastening parts 8 are prevented from protruding in the thickness direction of the panel body 54. As a result, the fastening parts 8 can be substantially prevented from being stuck by an external object, and can be less noticeable from the outside.

[(8) Variation 7 of Second Embodiment]

Figure 26A:
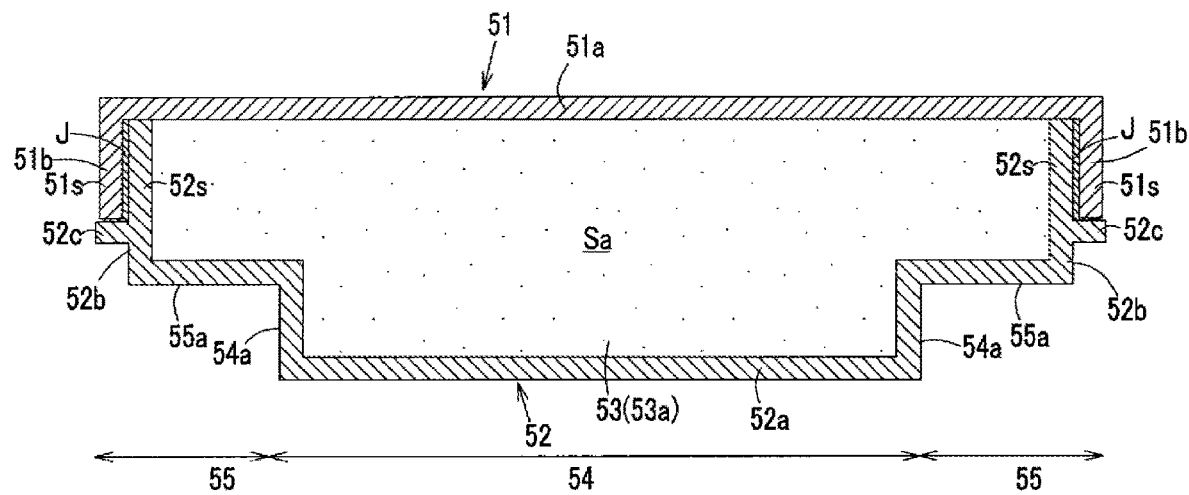
FIG. 26A is a cross-sectional view showing a hollow double-wall panel having two separate walls.
Figure 26B:
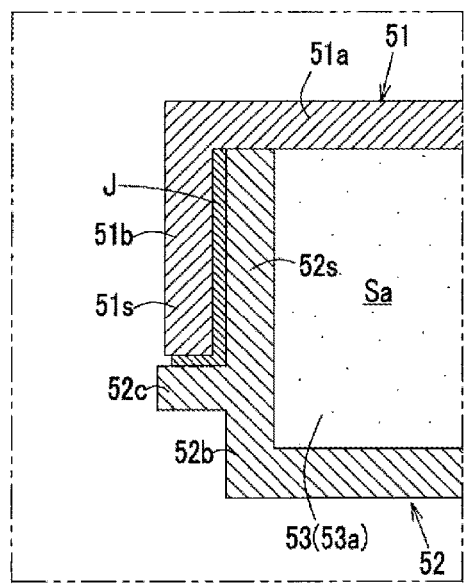
FIG. 26B is an enlarged view of a portion of FIG. 26A.

As shown in FIGS. 26A and 26B, Variation 7 is a modification of the second embodiment in which the two walls 51 and 52 of the hollow double-wall panel 5 are separately formed, and peripheral edges 51s and 52s of the two walls 51 and 52 are joined together by adhesion.

More specifically, one (e.g., the upper wall 51) of the walls 51 and 52 is formed in the shape of a shallow box that is open downward. More specifically, the wall 51 includes an upper wall 51a, and a peripheral wall 51b that is erected downward from a peripheral edge of the upper wall 51a. The other of the walls 51 and 52 (e.g., the lower wall 52) is formed in the shape of a shallow box that is open upward. More specifically, the wall 52 includes a lower wall 52a, and a peripheral wall 52b that is erected upward from a peripheral edge of the lower wall 52a.

An upper portion of the peripheral wall 52b of the wall 52 can be fitted into the peripheral wall 51b of the wall 51. A lower portion of the peripheral wall 52b of the wall 52 includes the lower surface 55a of the horizontal portion 55H and the side surface 54a of the panel body 54. An anchoring projection 52c for anchoring a lower end of the peripheral wall 51b of the wall 51 is provided on an outer peripheral surface of the peripheral wall 52b of the wall 52. The anchoring projection 52c projects outward from the outer peripheral surface of the peripheral wall 52b of the wall 52, and extends across the outer peripheral surface in a horizontal direction with respect to the lower surface 52a of the wall 52.

As shown in FIG. 26A, when the peripheral edges 51s and 52s of the two walls 51 and 52 are joined together, an upper portion of the peripheral wall 52b of the wall 52 is fitted into the peripheral wall 51b of the wall 51. In addition, an upper end of the peripheral wall 52b of the wall 52 abuts on a back surface of the upper wall 51a of the wall 51, and a lower end of the peripheral wall 51b of the wall 51 is anchored by the anchoring projection 52c of the peripheral wall 52b.

In addition, as shown in FIG. 26B, an adhesive material J is applied to a gap between an inner peripheral surface of the peripheral wall 51b of the wall 51 and an outer peripheral surface of the peripheral wall 52b of the wall 52. The peripheral edges 51s and 52s of the two walls 51 and 52 are joined together by adhesion due to the adhesive material J.

Thus, in Variation 7, the peripheral edges 51s and 52s of the two walls 51 and 52 are joined together by adhesion. Therefore, the flexibility of the shape and production method of the two walls 51 and 52 (i.e., the hollow double-wall panel 5) can be increased.

[(9) Variation 8 of Second Embodiment]

Variation 8 is a modification of the second embodiment in which the two walls 51 and 52 are formed of members having different masses such that the percentage of the mass difference between the two walls 51 and 52 (i.e., mass difference percentage), i.e., $\Delta M$ ($=(M1-M2)/M1\times 100$) is set in range of $\pm 10\%$ (preferably, 0%).

Note that, in Variation 8, as in the second embodiment, the two walls 51 and 52 may be integrally formed so that the peripheral edges of the two walls 51 and 52 are joined together. Alternatively, as in Variation 7, the two walls 51 and 52 may be separately formed, and then the peripheral edges of the two walls 51 and 52 are joined together by adhesion.

Figure 27:
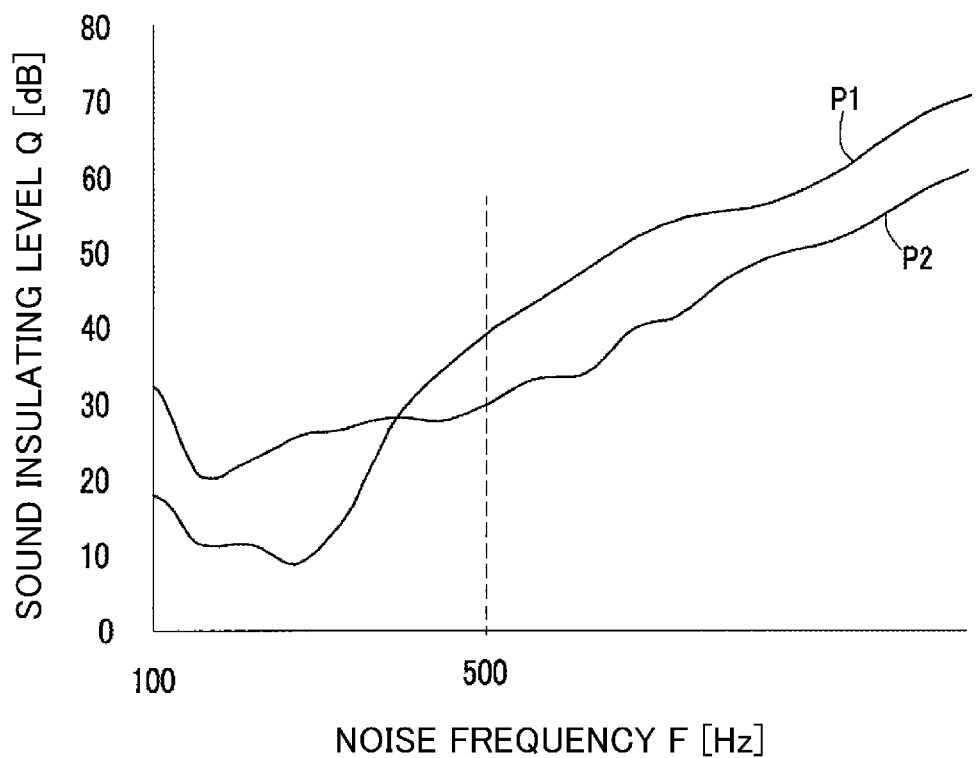
FIG. 27 is a diagram showing a relationship between a sound insulation level Q of a hollow double-wall panel and a noise frequency F.

FIG. 27 is a diagram showing a relationship between a sound insulation level Q (Bb) of the hollow double-wall panel 5 and a noise frequency F (Hz). The sound insulation level Q is the sound power of noise that can be absorbed or damped by the hollow double-wall panel 5, and the noise frequency F is the frequency of noise. In the graph of FIG. 27, a curve P1 indicates a relationship between the sound insulation level Q of the hollow double-wall panel 5 of Variation 8 and the noise frequency F, and a curve P2 indicates a relationship between the sound insulation level Q of a conventional hollow double-wall panel (e.g., a hollow double-wall panel described in the Background section) and the noise frequency F.

As can be seen from FIG. 27, in the case of the curve P1, the sound insulation level Q temporarily deceases rapidly in a low frequency region, and gradually increases in a high frequency region. In the case of the curve P2, the sound insulation level Q temporarily decreases rapidly and is higher than that of the curve P1 in a low frequency region, and gradually increases and is always lower than that of the curve P1 in a high frequency region.

The noise frequency F audible to humans is, for example, 500 Hz or more. As can be seen from FIG. 27, when the noise frequency F is less than 500 Hz, the curve P1 is lower than the curve P2. In other words, the conventional hollow double-wall panel has better sound insulating properties than those of the hollow double-wall panel 5 of Variation 8. However, when the noise frequency F is 500 Hz or more, the curve P1 is always higher than the curve P2. In other words, the hollow double-wall panel 5 of Variation 8 has better sound insulating properties than those of the conventional hollow double-wall panel.

Note that in a hollow double-wall panel in which a core material is contained between two walls, such as the hollow double-wall panel 5 of Variation 8 and the conventional hollow double-wall panel, the two walls resonate at the frequency of noise, and the resonance causes a temporary rapid decrease in the sound insulation level Q in a low frequency region. In such a hollow double-wall panel, as the mass difference percentage $\Delta M$ of the two walls approaches 0%, the resonant frequency of the resonance shifts to a lower frequency region. In other words, the curve (the curves 1 and 2) indicating the relationship between the sound insulation level Q and the noise frequency F shifts to a lower frequency region.

In particular, if the mass difference percentage ΔM of the two walls is in the range of ±10%, the entire curve (the curves 1 and 2) indicating the relationship between the sound insulation level Q and the noise frequency F shifts to a lower frequency region as shown in FIG. 27, so that the curve 2 is always higher than the curve 1 at the noise frequency F of 500 Hz or more.

Therefore, in the hollow double-wall panel 5 of Variation 8, the mass difference percentage ΔM of the two walls is set in the range of ±10% so that the hollow double-wall panel 5 of Variation 8 always has better sound insulating properties than those of conventional hollow double-wall panels at the noise frequency F of 500 Hz or more.

[(10) Variation 9 of Second Embodiment]

In the second embodiment, the hollow double-wall panel 5 is applied to a floor panel included in the floor FL in the interior of a car. The hollow double-wall panel 5 may be applied to a roof, dashboard panel, and door in addition to a floor panel. The hollow double-wall panel 5 additionally including a sound absorption layer on one of the main surfaces (e.g., a main surface closer to the interior of a car) is particularly effective when applied to a floor panel, roof, dashboard panel, or door. The hollow double-wall panel 5 additionally including a sound absorption layer and a skin layer on one of the main surfaces (e.g., a main surface closer to the interior of a car) is particularly effective when applied to a floor panel, roof or door. The hollow double-wall panel 5 additionally including a sound absorption layer on one of the main surfaces (e.g., a main surface closer to the interior of a car) is particularly effective when applied to a dashboard panel.

[(11) Variation 10 of Second Embodiment]

Figure 28:
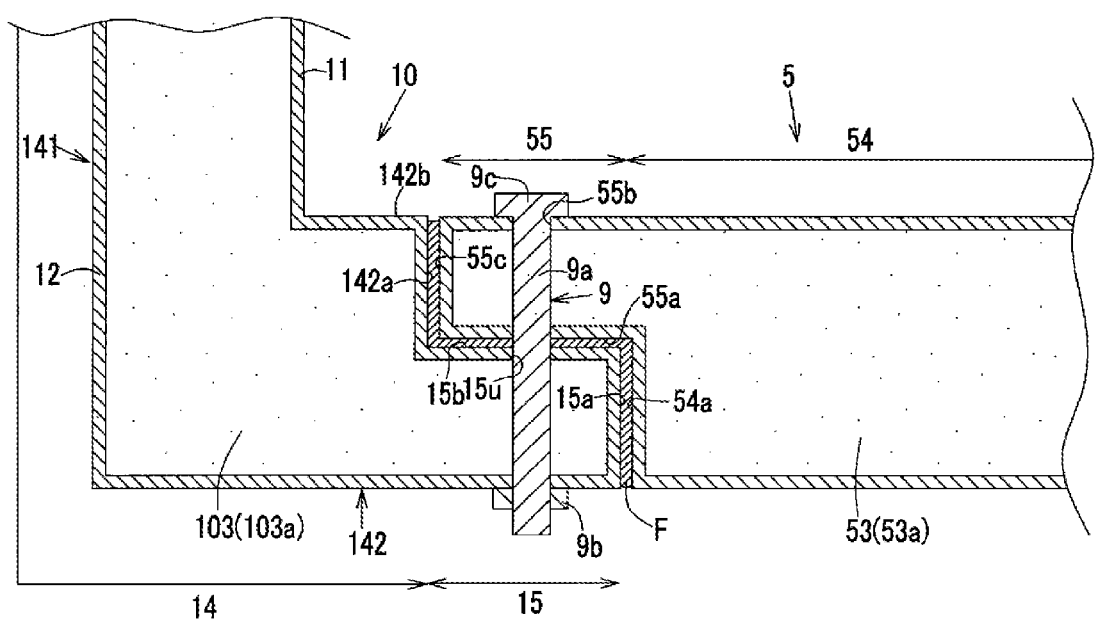
FIG. 28 is a cross-sectional view in the case of where hollow double-wall panels are joined together.

In the second embodiment, the hollow double-wall panel 5 is joined to framework members (the side sill 3 and the center tunnel 4). Alternatively, as shown in FIG. 28, in Variation 10, the hollow double-wall panel 5 is joined to another hollow double-wall panel (i.e., another hollow double-wall panel according to the present invention) 10 having the same structure. In addition, in Variation 10, the hollow double-wall panel 5 is joined to a second hollow double-wall panel 10 using an adhesive material F and fastening parts 9 (a bolt 9a and a nut 9b).

A through-hole 55b into which a fastening part 9 is inserted is provided in the joint portion 55 of the hollow double-wall panel 5. The through-hole 55b penetrates through the joint portion 55 in the thickness direction.

The second hollow double-wall panel 10 is formed as, for example, a dashboard panel which separates an engine room from the interior of a car. In the second hollow double-wall panel 10, peripheral edges of two walls 11 and 12 are joined together as in the hollow double-wall panel 5. A core layer 103 (i.e., a core material 103a) is provided in a closed space between the two walls 11 and 12.

As with the hollow double-wall panel 5, the second hollow double-wall panel 10 includes a panel body 14, and an edge (i.e., a joint portion) 15 excluding the panel body 14. The panel body 14, which is formed in the shape of, for example, substantially a letter L as viewed from the side, has a vertical portion 141 extending vertically, and a horizontal portion 142 extending laterally from a lower portion of the vertical portion 141.

The joint portion 15 is in the shape of a plate that protrudes from a lower portion of a side surface 142a of the horizontal portion 142 of the panel body 14, in a horizontal direction with respect to the horizontal portion 142. Specifically, the joint portion 15 is provided at a predetermined depth from an upper surface 142b of the horizontal portion 142, in the thickness direction of the horizontal portion 142, i.e., there is a level difference (step) between the joint portion 15 and the upper surface 142b of the horizontal portion 142. A through-hole 15u in which a fastening part 9 is inserted is provided in the joint portion 15. The through-hole 15u penetrates through the joint portion 15 in the thickness direction.

When the hollow double-wall panel 5 is joined to the second hollow double-wall panel 10, the lower surface (joint surface) 55a of the joint portion 55 of the hollow double-wall panel 5 is put on top of an upper surface (i.e., a joint surface) 15b of the joint portion 15 of the second hollow double-wall panel 10, so that the core material 53a in the joint portion 55 covers the upper surface 15b of the joint portion 15, and the core material 103a in the joint portion 15 covers the lower surface 55a of the joint portion 55. In addition, the side surface 55c of the joint portion 55 of the hollow double-wall panel 5 adjoins the side surface 142a of the second hollow double-wall panel 10, and the side surface 54a of the panel body 54 of the hollow double-wall panel 5 adjoins an end surface 15a of the joint portion 15 of the second hollow double-wall panel 10.

In addition, in the above joined state, an adhesive material F is applied to gaps at the joint portion between the hollow double-wall panels 5 and 10 (i.e., a gap between the surfaces 55c and 142a, a gap between the surfaces 55a and 15b, and a gap between the surfaces 54a and 15a). In addition, the bolt 9a is inserted into the through-holes 55b and 15u of the joint portions 55 and 15 of the hollow double-wall panels 5 and 10 successively, and is then screwed into the nut 9b.

Thus, in Variation 10, the hollow double-wall panel 5 is joined to the hollow double-wall panel 10 having the same structure. Therefore, the hollow double-wall panel 5 can be preferably used as a panel member for various parts in the interior of a car.

What is claimed is:

1. An automotive panel structure wherein
the panel structure includes a double-wall panel,
the double-wall panel includes
an inner wall,
an outer wall facing the inner wall, and
a core material enclosed between the inner wall and the outer wall, and having at least a predetermined thickness across the panel in all in-plane directions of the walls,
the core material has a specific surface area of 20,000 $mm^2/cm^3$ or more, where the specific surface area is defined as a surface area per unit volume.

2. The automotive panel structure of claim 1, wherein the core material has a packing density of 0.11 $g/cm^3$ or less.

3. The automotive panel structure of claim 1, wherein the core material is a fibrous substance and has a fiber thickness of 0.1-3 denier.

4. The automotive panel structure of claim 3, wherein the fibrous substance contains at least one of polyester, acrylic resin, nylon, polypropylene, cotton, and rayon.

5. The automotive panel structure of claim 1, wherein the core material is a gas-permeable foam substance and has a framework thickness of 3-7 µm.

6. The automotive panel structure of claim 5, wherein the foam substance contains at least one of polyurethane and rubber.

7. The automotive panel structure of claim 1, wherein the predetermined thickness is in the range of 15-50 mm.

8. The automotive panel structure of claim 1, wherein the double-wall panel further includes
- a core layer including a gas and the core material,
- the core material is formed of a fibrous substance or a gas-permeable foam substance, and
- a stiffness of the outer wall is lower than a stiffness of the inner wall.

9. The automotive panel structure of claim 8, wherein the stiffness of the outer wall is lower than or equal to the stiffness of PP or PE, and
the stiffness of the inner wall is higher than or equal to the stiffness of glass fiber-reinforced resin.

10. The automotive panel structure of claim 8, wherein the double-wall panel further includes
- a vertical wall configured to join the inner wall and the outer wall together, wherein the vertical wall is disposed at a peripheral portion of the inner and outer walls, and the vertical wall is mostly formed of the same material as that of the outer wall.

11. The automotive panel structure of claim 8, wherein the double-wall panel further includes
- a vertical wall configured to join the inner wall and the outer wall together, wherein the vertical wall is disposed at a peripheral portion of the inner and outer walls, and the vertical wall is mostly formed of the same material as that of the inner wall.

12. The automotive panel structure of claim 8, wherein the core layer is disposed closer to the outer wall between the inner wall and the outer wall, and
the double-wall panel further includes
- a stiff material having a stiffness higher than or equal to that of the inner wall, and disposed closer to the inner wall between the inner wall and the outer wall.

13. The automotive panel structure of claim 8, wherein the core layer contains the core material formed of a fibrous substance, and
the core material is disposed with a fiber direction thereof pointing along a wall surface of the outer wall.

14. The automotive panel structure of claim 8, wherein the inner wall and the outer wall have the same mass.

15. The automotive panel structure of claim 1, wherein the double-wall panel is a hollow double-wall panel, and an edge of the hollow double-wall panel is joined to a joint surface of a joint mating member,
in the hollow double-wall panel, peripheral edges of the two walls are joined together, and a closed space between the two walls is filled with the core material to such an extent that an inside of the edge of the hollow double-wall panel is filled with the core material, and
when the edge of the hollow double-wall panel is joined to the joint surface of the joint mating member, the core material contained in the edge of the hollow double-wall panel covers the joint surface of the joint mating member.

16. The automotive panel structure of claim 15, wherein the joint mating member is a framework member of a car body, or a panel having the same structure as that of the hollow double-wall panel,
the edge of the hollow double-wall panel is joined to the joint surface of the joint mating member by a fastening part,
a through-hole through which the fastening part is inserted is provided in the edge of the hollow double-wall panel, penetrating through the edge in a thickness direction of the edge,
the hollow double-wall panel has an aperture ratio of less than 1%, where the aperture ratio is defined as the proportion of the opening area of one of openings of the through-hole to the area of one of main surfaces of the hollow double-wall panel, and
a gap between the edge of the hollow double-wall panel and the fastening part is sealed by a sealing material.

17. The automotive panel structure of claim 15, wherein a core layer formed of the core material contained in the closed space of the hollow double-wall panel has a thickness in the range of 7-50 mm.

18. The automotive panel structure of claim 15, wherein the two walls are formed of materials have different masses, and has a mass difference percentage $\Delta M$ in the range of ±10%.

19. The automotive panel structure of claim 15, wherein the hollow double-wall panel has the edge, and a panel body excluding the edge,
the edge has a vertical portion protruding perpendicularly to the panel body, and
a surface in a thickness direction of the vertical portion is joined to the joint surface of the joint mating member.

20. The automotive panel structure of claim 15, wherein the hollow double-wall panel has the edge, and a panel body excluding the edge,
the edge has a sloping portion sloping in one direction in a thickness direction of the panel body, and
a surface facing in a thickness direction of the sloping portion is joined to the joint surface of the joint mating member.

* * * * *